(12) United States Patent
Ohira et al.

(10) Patent No.: US 12,449,699 B2
(45) Date of Patent: Oct. 21, 2025

(54) DISPLAY DEVICE

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/745,147

(22) Filed: Jun. 17, 2024

(65) Prior Publication Data

US 2024/0427185 A1    Dec. 26, 2024

(30) Foreign Application Priority Data

Jun. 20, 2023  (JP) ................................. 2023-101110

(51) Int. Cl.
  *G02F 1/1343*  (2006.01)
  *G02F 1/13*  (2006.01)
  *G02F 1/1347*  (2006.01)
(52) U.S. Cl.
  CPC ...... *G02F 1/134309* (2013.01); *G02F 1/1323* (2013.01); *G02F 1/1347* (2013.01); *G02F 1/13471* (2013.01)
(58) Field of Classification Search
  CPC .. G02F 1/1323; G02F 1/1347; G02F 1/13471; B60K 2360/195; B60K 2360/1526; G09G 3/3618
  See application file for complete search history.

(56) References Cited

U.S. PATENT DOCUMENTS

| | | | |
|---|---|---|---|
| 2006/0044928 A1* | 3/2006 | Chui ................... | G09G 3/3466 365/232 |
| 2018/0231836 A1* | 8/2018 | Suzuki ............... | G02F 1/13471 |
| 2024/0248362 A1* | 7/2024 | Chiu ...................... | G02F 1/137 |

FOREIGN PATENT DOCUMENTS

JP    2006-195388 A    7/2006

\* cited by examiner

*Primary Examiner* — Jessica M Merlin
(74) *Attorney, Agent, or Firm* — K&L Gates LLP

(57) ABSTRACT

According to an aspect, a display device includes: a display panel having a display region configured to output an image; a light source configured to emit light toward one surface side of the display panel; a liquid crystal panel interposed between the display panel and the light source and provided to be able to change a transmission degree of light between the display panel and the light source; a signal generator coupled to two electrodes facing each other with liquid crystal interposed between the electrodes in the liquid crystal panel and configured to provide an individual electric signal to each of the two electrodes; and a signal sensor coupled to the two electrodes and configured to individually sense the electric signals provided to the two electrodes.

3 Claims, 22 Drawing Sheets

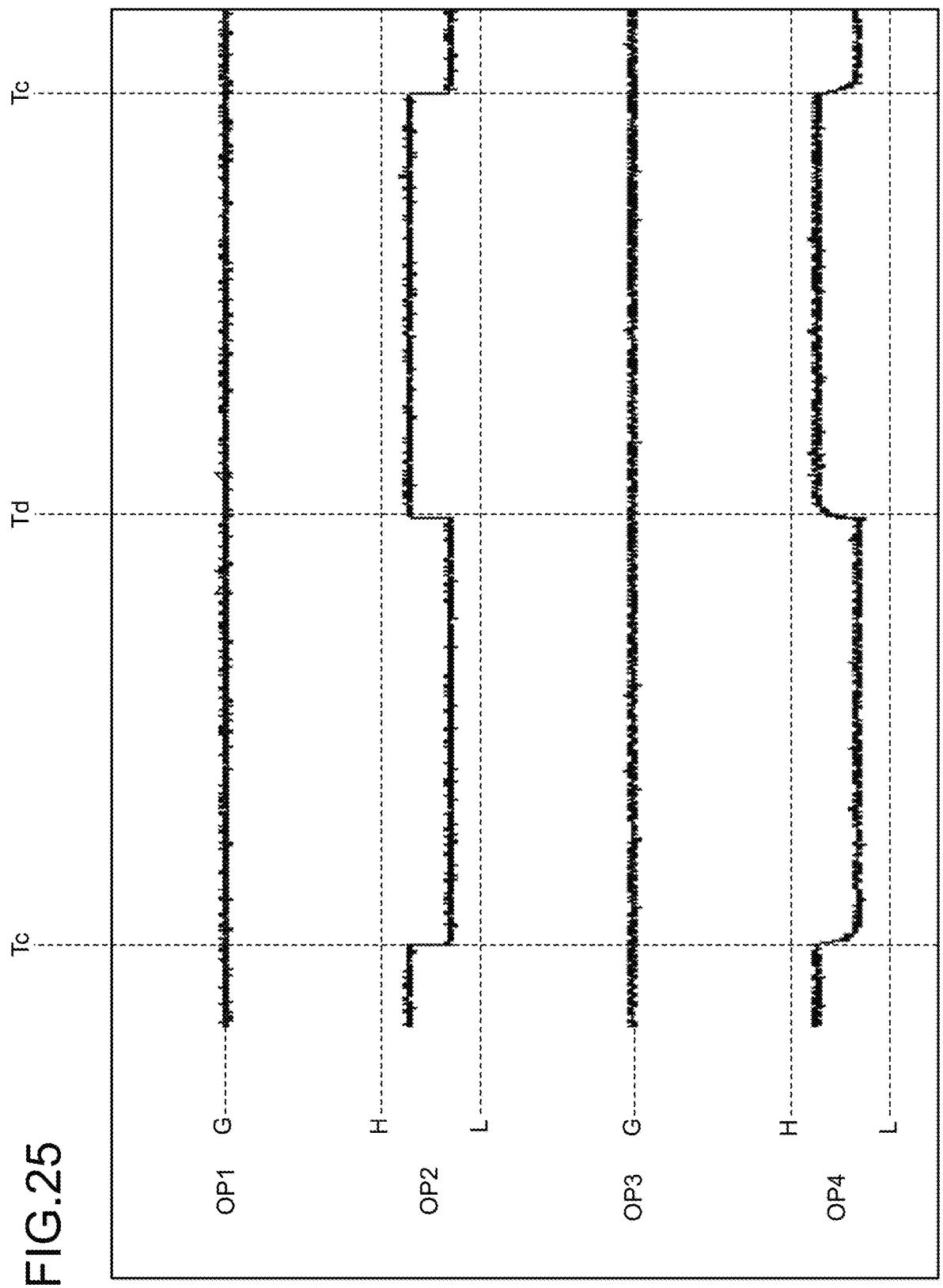

DISPLAY DEVICE

CROSS-REFERENCE TO RELATED APPLICATION

This application claims the benefit of priority from Japanese Patent Application No. 2023-101110 filed on Jun. 20, 2023, the entire contents of which are incorporated herein by reference.

BACKGROUND

1. Technical Field

What is disclosed herein relates to a display device.

2. Description of the Related Art

In recent years, there is a demand for display devices to be able to change the range of view angles in which an image can be viewed. For example, a display device mounted on a vehicle such as a four-wheel automobile is desired to achieve a view angle range in which an image can be viewed from the front passenger seat side and the image cannot be viewed from the driver seat side only during driving. To achieve such a view angle range, Japanese Patent Application Laid-open Publication No. 2006-195388 discloses technologies in which a liquid crystal panel for light adjustment with a switchable view angle range is placed over an image display panel have been disclosed.

When a liquid crystal panel for light adjustment fails to operate normally, an image may become visible from a view angle range where the image is not originally intended to be output. It is undesirable for the image to continue to be output in such a state. Thus, there has been a demand for a mechanism capable of sensing the operation state of the liquid crystal panel in relation to operation control of a display device.

For the foregoing reasons, there is a need for a display device capable of sensing the operation state of a liquid crystal panel.

SUMMARY

According to an aspect, a display device includes: a display panel having a display region configured to output an image; a light source configured to emit light toward one surface side of the display panel; a liquid crystal panel interposed between the display panel and the light source and provided to be able to change a transmission degree of light between the display panel and the light source; a signal generator coupled to two electrodes facing each other with liquid crystal interposed between the electrodes in the liquid crystal panel and configured to provide an individual electric signal to each of the two electrodes; and a signal sensor coupled to the two electrodes and configured to individually sense the electric signals provided to the two electrodes.

BRIEF DESCRIPTION OF THE DRAWINGS

FIG. 25 is a waveform diagram illustrating an example of the input from the terminals OP1, OP2, OP3, and OP4 when the wiring lines IN1 and IN2 are short-circuited.

DETAILED DESCRIPTION

An embodiment of the present disclosure is described below with reference to the drawings. What is disclosed herein is only an example, and any modification that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
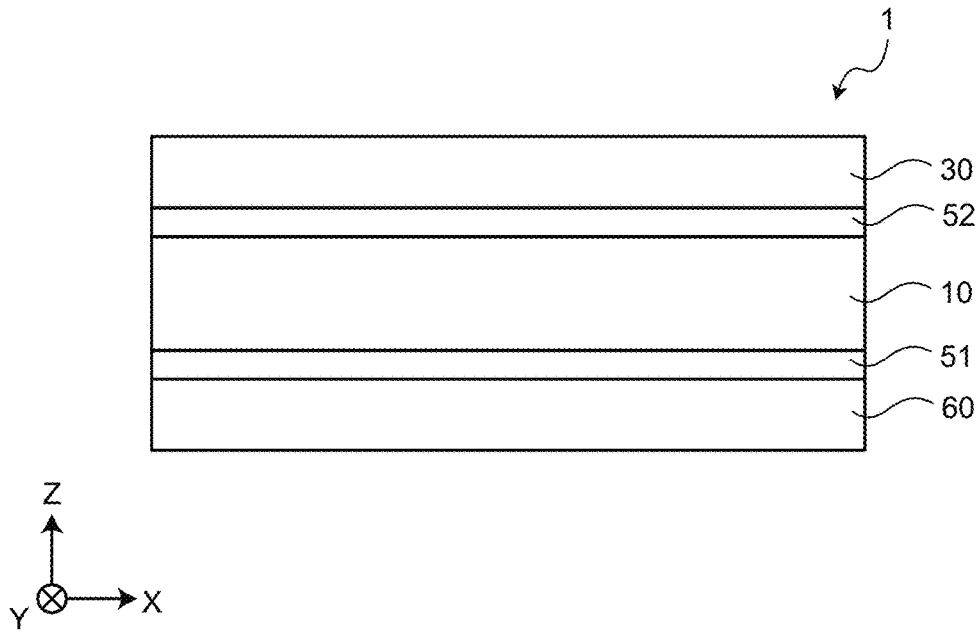
FIG. 1 is a schematic view illustrating an example of a main configuration of a display device according to an embodiment.

FIG. 1 is a schematic view illustrating an example of a main configuration of a display device 1 according to an embodiment. The display device 1 includes a light adjuster 10, a display panel 30, a light source 60, a retardation generation layer 51, and a retardation generation layer 52. A third direction Z is defined to be a direction in which the light adjuster 10, the display panel 30, the light source 60, the retardation generation layer 51, and the retardation generation layer 52 are stacked. A first direction X is defined to be one of two directions orthogonal to the third direction Z, and a second direction Y is defined to be the other direction thereof. The first direction X and the second direction Y are orthogonal to each other. In the display device 1, the light source 60, the retardation generation layer 51, the light adjuster 10, the retardation generation layer 52, and the display panel 30 are stacked in the stated order from one side in the third direction Z toward the other side.

Figure 2:
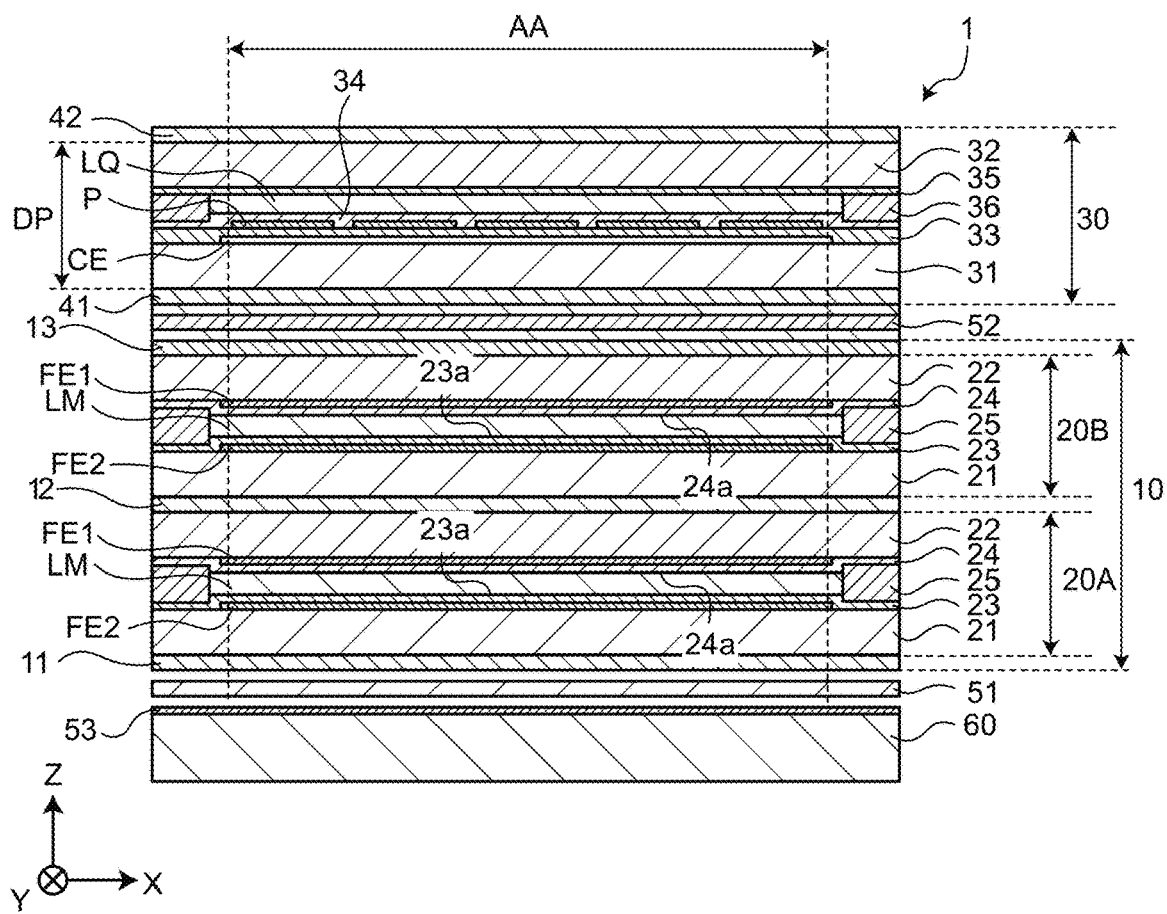
FIG. 2 is a schematic sectional view of components included in the display device.

FIG. 2 is a schematic sectional view of components included in the display device 1. FIG. 2 illustrates gaps provided between the light source 60 and the retardation generation layer 51, between the retardation generation layer 51 and the light adjuster 10, between the light adjuster 10 and the retardation generation layer 52, and between the retardation generation layer 52 and the display panel 30, respectively. The gaps, however, are illustrated to facilitate understanding of the diagram and are unnecessary in the actual display device 1 (refer to FIG. 1).

The light adjuster 10 has a configuration in which a first polarization layer 11, a first liquid crystal panel 20A, a second polarization layer 12, a second liquid crystal panel 20B, and a third polarization layer 13 are stacked from the one side in the third direction Z toward the other side. The first polarization layer 11, the second polarization layer 12, and the third polarization layer 13 as well as a fourth polarization layer 41 and a fifth polarization layer 42 to be described later are each an optical member provided to most transmit light polarized in a specific direction. The specific direction is referred to as a transmission axis direction. The transmission axis direction extends along a polarization plate. Accordingly, the transmission axis direction is orthogonal to the third direction Z. A direction orthogonal to the transmission axis direction and the third direction Z is referred to as an absorption axis direction. The absorption axis direction is a polarization direction in which light is most unlikely to pass through the polarization plate.

The first liquid crystal panel 20A and the second liquid crystal panel 20B are liquid crystal panels. The first liquid crystal panel 20A and the second liquid crystal panel 20B have the same device configuration except that they are provided at different positions. Hereinafter, the phrase "liquid crystal panel 20" collectively means the first liquid crystal panel 20A and the second liquid crystal panel 20B. Thus, description related to the liquid crystal panel 20 is applicable to both the first liquid crystal panel 20A and the second liquid crystal panel 20B. The liquid crystal panel 20 of the embodiment is a liquid crystal panel of what is called a twisted nematic (TN) type.

The liquid crystal panel 20 has a configuration in which a first substrate 21 is provided on the one side of liquid crystal LM and a second substrate 22 is provided on the other side. The first substrate 21 and the second substrate 22 are light-transmitting substrates. The light-transmitting substrates are, for example, glass substrates but not limited thereto and may be substrates of any other light-transmitting material. Hereinafter, the phrase "one surface" means a surface of a plate-shaped component on the one side in the third direction Z. The phrase "the other surface" means a surface of the plate-shaped component on the other side in the third direction Z.

An electrode FE2 is formed on the other surface of the first substrate 21. An electrode FE1 is formed on one surface of the second substrate 22. The electrodes FE2 and FE1 are electrodes provided to cover a display region AA. The other surface of the electrode FE2 and the other surface of the first substrate 21 in an area where the electrode FE2 is not formed are covered by an insulating layer 23. One surface of the electrode FE1 and the one surface of the second substrate 22 in an area where the electrode FE1 is not formed are covered by an insulating layer 24. The display region AA will be described later.

At least one of the electrodes FE2 and FE1 is provided so that its potential can be changed in accordance with ON and OFF of operation of the liquid crystal panel 20. In other words, voltage generated between the electrodes FE2 and FE1 is different between a case where the liquid crystal panel 20 is in operation (ON) and a case where the liquid crystal panel 20 is not in operation (OFF).

The liquid crystal LM is interposed at least in the display region AA between the insulating layer 23 and the insulating layer 24. A seal 25 is interposed between the insulating layer 23 and the insulating layer 24 outside the display region AA. Although not illustrated, the seal 25 is a frame-shaped member enclosing the liquid crystal LM when viewed at a viewpoint of viewing a plane (X-Y plane) orthogonal to the third direction Z from the front. The liquid crystal LM is surrounded by the seal 25 between the insulating layer 23 and the insulating layer 24, and thus, enclosed in the liquid crystal panel 20.

An alignment film 23a is provided on the other surface of the insulating layer 23 at least in an area where the display region AA is covered. An alignment film 24a is provided on one surface of the insulating layer 24 at least in an area where the display region AA is covered. The alignment films 23a and 24a align the orientation of each liquid crystal molecule contained in the liquid crystal LM with a particular direction. The orientation of each liquid crystal molecule changes as the potential difference between the electrodes FE2 and FE1 changes.

The display panel 30 is a liquid crystal panel different from the liquid crystal panel 20. The display panel 30 includes a plurality of pixels. The display panel 30 is an image-display liquid crystal panel provided to be able to individually control the transmission degree of light at the position of each pixel in accordance with image data input from the outside.

The display panel 30 illustrated in FIG. 2 is a liquid crystal panel of what is called an in-plane switching (IPS) type. In the display panel 30, a pixel substrate 31 is provided on one side of liquid crystal LQ in the third direction Z, and a counter substrate 32 is provided on the other side thereof. In addition, the fourth polarization layer 41 is provided on one surface side of the pixel substrate 31. The fifth polarization layer 42 is provided on the other surface side of the counter substrate 32. Hereinafter, the phrase "panel DP" means part of the configuration of the display panel 30 other than the fourth polarization layer 41 and the fifth polarization layer 42.

For example, a common electrode CE, an insulating layer 33, pixel electrodes P, and an insulating layer 34 are stacked on the other surface of the pixel substrate 31 from the one side in the third direction Z toward the other side. For example, a color filter 35 is stacked on one surface of the counter substrate 32. A seal 36 is interposed between the insulating layer 34 and the color filter 35 outside the display region AA. The seal 36 has the same shape as the seal 25 described above. The liquid crystal LQ is surrounded by the seal 36 between the insulating layer 34 and the color filter 35, and thus, enclosed in the display panel 30.

The display region AA is a region in which a plurality of pixel electrodes P are disposed in the display panel 30. The pixel electrodes P are two-dimensionally arranged along an X-Y plane in the display region AA. The display panel 30 is a display panel of what is called an active matrix type, which is provided to be able to display and output any desired image by individually controlling the transmission degree of light at each pixel electrode P. More specifically, in the display panel 30 of the embodiment, potential as a reference is provided to the common electrode CE. In addition, individual potentials (pixel signals) are provided to the pixel electrodes P, and accordingly, the transmission degrees of light at the pixel electrodes P are individually controlled. Thus, the display region AA is a region in which an image is displayed and output.

The retardation generation layers 51 and 52 are optical members each of which causes the optical retardation of light entering from the one side in the third direction Z and transmit the light to the other side in the third direction Z. The retardation generation layers 51 and 52 of the embodiment are what is called ½ wave plates.

The light source 60 emits light toward the other surface side where a polarization generation layer 53 is provided. The polarization generation layer 53 is an optical member that converts light emitted from the other surface of the light source 60 into polarized light at a specific angle. The polarization generation layer 53 is, for example, a dual brightness enhancement film (DBEF) but not limited thereto and only needs to be a component that can convert light emitted from the other surface of the light source 60 into polarized light at the specific angle. Light emitted by the light source 60 is exited from the other surface side of the display device 1 through the polarization generation layer 53, the light adjuster 10, the fourth polarization layer 41, the display panel 30, and the fifth polarization layer 42.

Figure 3:
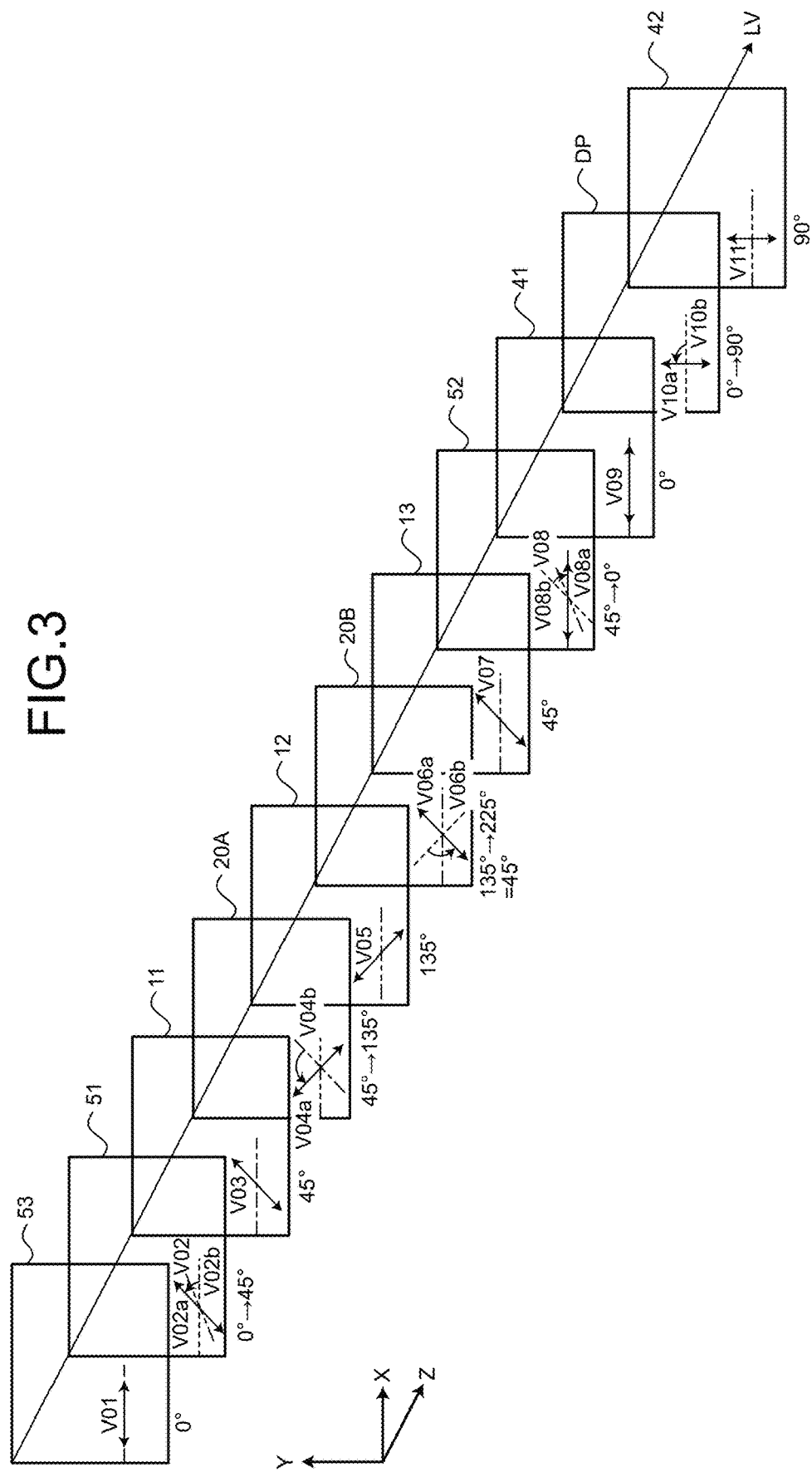
FIG. 3 is a diagram illustrating changes in the polarization direction of light from when light is emitted by a light source to when the light is exited from the other surface side of the display device.

The following describes changes in the polarization direction of light from when light is emitted by the light source 60 to when the light is exited from the other surface side of the display device 1, with reference to FIG. 3.

FIG. 3 is a diagram illustrating changes in the polarization direction of light from when light is emitted by the light source 60 to when the light is exited from the other surface side of the display device 1. In the following description, polarized light in the first direction X is defined as polarized light at 0°. In description with reference to FIG. 3, the angle of polarization is expressed in a minor angle smaller than 180° with respect to the polarized light at 0°. In description with reference to FIG. 3, of the changes in the polarization direction of light, a change with anticlockwise rotation by r° along an X-Y plane is referred to as a "change of +r°", and a change with opposite (clockwise) rotation by r° is referred to as a "change of −r°". The variable r is a real number equal to or larger than zero.

In the embodiment, a polarization axis direction V01 of the polarization generation layer 53 is set so that light emitted from the other surface of the light source 60 is converted into polarized light at 0° and transmitted. Thus, polarized light having passed through the polarization generation layer 53 and incident on the retardation generation layer 51 is polarized light at 0°.

The retardation generation layer 51 is a ½ wave plate as described above. The retardation generation layer 51 of the embodiment causes change in the anticlockwise (+) direction. A slow axis direction V02 of the retardation generation layer 51 is set so as to be at +22.5° relative to the polarized light (0°) passing through the polarization generation layer 53. Accordingly, polarized light undergoes a change of +45° while passing through the retardation generation layer 51. Thus, polarized light having passed through the retardation generation layer 51 and incident on the first polarization layer 11 is polarized light at 45°. FIG. 3 illustrates an angle V02b of the polarized light incident on the retardation generation layer 51 and an angle V02a of the polarized light having passed through the retardation generation layer 51.

A transmission axis direction V03 of the first polarization layer 11 is set to allow maximum transmission of polarized light at 45°. Thus, light having passed through the retardation generation layer 51 can pass through the first polarization layer 11. Polarized light having passed through the first polarization layer 11 and incident on the first liquid crystal panel 20A is polarized light at 45°.

The liquid crystal panel 20 is provided to apply a change of +90° to polarized light passing therethrough from the one side in the third direction Z to the other side. In other words, the polarized light undergoes the change of +90° while passing through the first liquid crystal panel 20A. Thus, polarized light having passed through the first liquid crystal panel 20A and incident on the second polarization layer 12 is polarized light at 135°. FIG. 3 illustrates an angle V04b of polarized light incident on the first liquid crystal panel 20A and an angle V04a of polarized light having passed through the first liquid crystal panel 20A.

A transmission axis direction V05 of the second polarization layer 12 is set to allow maximum transmission of polarized light at 135°. Thus, light having passed through the first liquid crystal panel 20A can pass through the second polarization layer 12. Polarized light having passed through the second polarization layer 12 and incident on the second liquid crystal panel 20B is polarized light at 135°.

Polarized light undergoes the change of +90° while passing through the second liquid crystal panel 20B. Thus, polarized light having passed through the second liquid crystal panel 20B and incident on the third polarization layer 13 is polarized light at 225°, which is the same as polarized light at 45°. FIG. 3 illustrates an angle V06b of polarized light incident on the second liquid crystal panel 20B and an angle V06a of polarized light having passed through the second liquid crystal panel 20B.

A transmission axis direction V07 of the third polarization layer 13 is set to allow maximum transmission of polarized light at 45°. Thus, light having passed through the second liquid crystal panel 20B can pass through the third polarization layer 13. Polarized light having passed through the third polarization layer 13 and incident on the retardation generation layer 52 is polarized light at 45°.

The retardation generation layer 52 is a ½ wave plate as described above. The retardation generation layer 52 of the embodiment causes a change in the clockwise (−) direction. A slow axis direction V08 of the retardation generation layer 52 is set so as to be at −22.5° relative to polarized light (45°) passing through the polarization generation layer 53. Accordingly, polarized light undergoes a change of −45° while passing through the retardation generation layer 52. Thus, polarized light having passed through the retardation generation layer 52 and incident on the fourth polarization layer 41 is polarized light at 0°. FIG. 3 illustrates an angle V08b of polarized light incident on the retardation generation layer 52 and an angle V08a of polarized light having passed through the retardation generation layer 52.

A transmission axis direction V09 of the fourth polarization layer 41 is set to allow maximum transmission of polarized light at 0°. Thus, light having passed through the retardation generation layer 52 can pass through the fourth polarization layer 41. Polarized light having passed through the fourth polarization layer 41 and incident on the panel DP is polarized light at 0°.

The panel DP is provided to apply a change of +90° to polarized light passing therethrough from the one side in the third direction Z to the other side. In other words, polarized light undergoes the change of +90° while passing through the panel DP. Thus, polarized light having passed through the panel DP and incident on the fifth polarization layer 42 is polarized light at 90°. FIG. 3 illustrates an angle V10b of polarized light incident on the panel DP and an angle V10a of polarized light having passed through the panel DP.

A transmission axis direction V11 of the fifth polarization layer 42 is set to allow maximum transmission of polarized light at 90°. Thus, light having passed through the panel DP can pass through the fifth polarization layer 42. In this manner, a transmission path LV of light from the light source 60 to the other surface side of the fifth polarization layer 42 is formed.

The liquid crystal panel 20 will be more specifically described below with reference to FIGS. 4 to 7.

Figure 4:
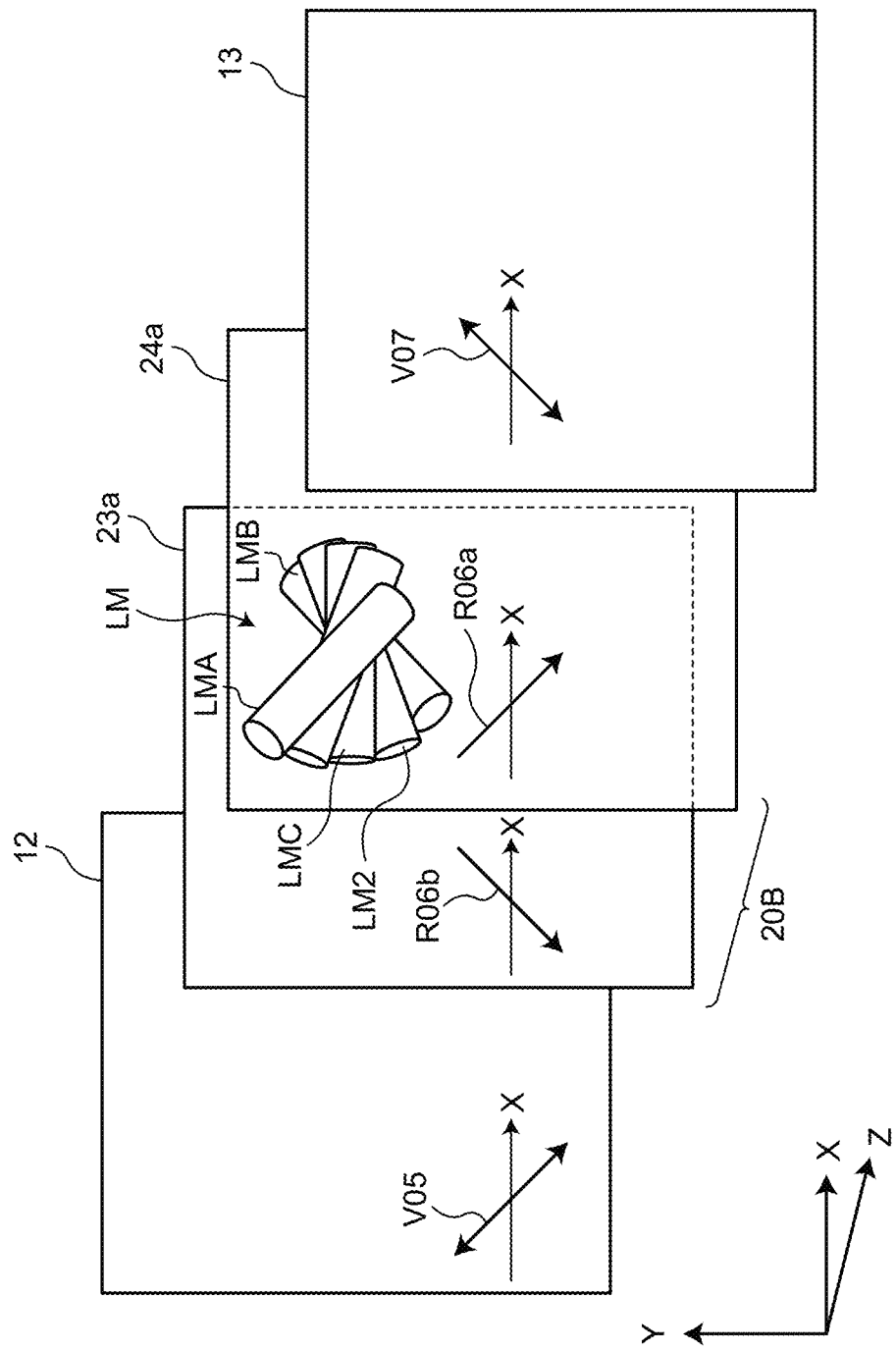
FIG. 4 is a diagram illustrating the relation of rubbing directions R06a and R06b of respective alignment films included in a second liquid crystal panel with transmission axis directions of a second polarization layer and a third polarization layer disposed facing in a third direction with the second liquid crystal panel interposed therebetween.

FIG. 4 is a diagram illustrating the relation of rubbing directions R06a and R06b of the respective alignment films 23a and 24a included in the second liquid crystal panel 20B with the transmission axis directions of the second polarization layer 12 and the third polarization layer 13 disposed facing each other in the third direction Z with the second liquid crystal panel 20B interposed therebetween. In description with reference to FIG. 4 and FIG. 7 to be described later, a direction toward one side in the first direction X (the right side in FIG. 4) is defined as a direction at 0°. A direction having an angle formed anticlockwise relative to the direction at 0° is defined as a direction at a positive (+) angle) (°, and a direction having an angle formed clockwise is defined as a direction at a negative (−) angle) (°).

The alignment films 23a and 24a are each provided with rubbing treatment on a contacting surface side with the liquid crystal LM to align the orientation of each liquid crystal molecule with a particular direction. The particular direction provided by the rubbing treatment is a rubbing direction. The rubbing direction R06b of the alignment film 23a is at 225° (−135°). The rubbing direction R06a of the alignment film 24a is at 315° (−45°).

The alignment film 23a is stacked on the other surface of the first substrate 21 in the second liquid crystal panel 20B, and the second polarization layer 12 faces one surface of the first substrate 21. As illustrated in FIGS. 3 and 4, a transmission axis direction V05 of the second polarization layer 12 is at 135°. Accordingly, the rubbing direction R06b of the alignment film 23a and the transmission axis direction V05 of the second polarization layer 12 are orthogonal to each other.

The alignment film 24a is stacked on one surface of the second substrate 22 in the second liquid crystal panel 20B, and the third polarization layer 13 faces the other surface of the second substrate 22. As illustrated in FIGS. 3 and 4, a transmission axis direction V07 of the third polarization layer 13 is at 45°. Accordingly, the rubbing direction R06a of the alignment film 24a and the transmission axis direction V07 of the third polarization layer 13 are orthogonal to each other.

As described above with reference to FIG. 4, in the second liquid crystal panel 20B of the embodiment, the rubbing direction of an alignment film stacked on a substrate and the orientation axis of a polarization layer contacting the substrate are orthogonal to each other. In other words, the second liquid crystal panel 20B is provided as what is called an O-mode liquid crystal panel.

As described above, the first liquid crystal panel 20A and the second liquid crystal panel 20B have the same configuration of a liquid crystal panel (the liquid crystal panel 20). Accordingly, the rubbing direction R06b of the alignment film 23a on one surface side of the first liquid crystal panel 20A is at 225° (−135°) as in the second liquid crystal panel 20B. A transmission axis direction V03 of the first polarization layer 11 disposed on the one surface side of the first liquid crystal panel 20A is at 45°. The rubbing direction R06a of the alignment film 24a on the other surface side of the first liquid crystal panel 20A is 315° (−45°) as in the second liquid crystal panel 20B. The transmission axis direction V05 of the second polarization layer 12 disposed on the other surface side of the first liquid crystal panel 20A is at 135°. Accordingly, in the first liquid crystal panel 20A of the embodiment, the rubbing direction of an alignment film stacked on a substrate and the orientation axis of a polarization layer contacting the substrate are parallel to each other. In other words, the first liquid crystal panel 20A is provided as what is called an E-mode liquid crystal panel.

More specifically, the shape of each liquid crystal molecule contained in the liquid crystal LM can be regarded as a prolate spheroid. The long axis direction of the prolate spheroid is defined as an "ne ($n_{extraordinary}$) axis". The short axis direction of the prolate spheroid orthogonal to the ne axis is defined as an "no ($n_{ordinary}$) axis". In the E mode, the rubbing direction of the alignment film 23a is set so that the transmission axis direction of the polarization layer facing the alignment film 23a with the first substrate 21 interposed therebetween is aligned with the ne axis, and the rubbing direction of the alignment film 24a is set so that the transmission axis direction of the polarization layer facing the alignment film 24a with the second substrate 22 interposed therebetween is aligned with the ne axis. In the O mode, the rubbing direction of the alignment film 23a is set so that the transmission axis direction of the polarization layer facing the alignment film 23a with the first substrate 21 interposed therebetween is aligned with the no axis, and the rubbing direction of the alignment film 24a is set so that the transmission axis direction of the polarization layer facing the alignment film 24a with the second substrate 22 interposed therebetween is aligned with the no axis.

A rubbing direction does not limit polarized light passing therethrough. In other words, the alignment films 23a and 24a transmit light irrespective of their rubbing directions.

Figure 5:
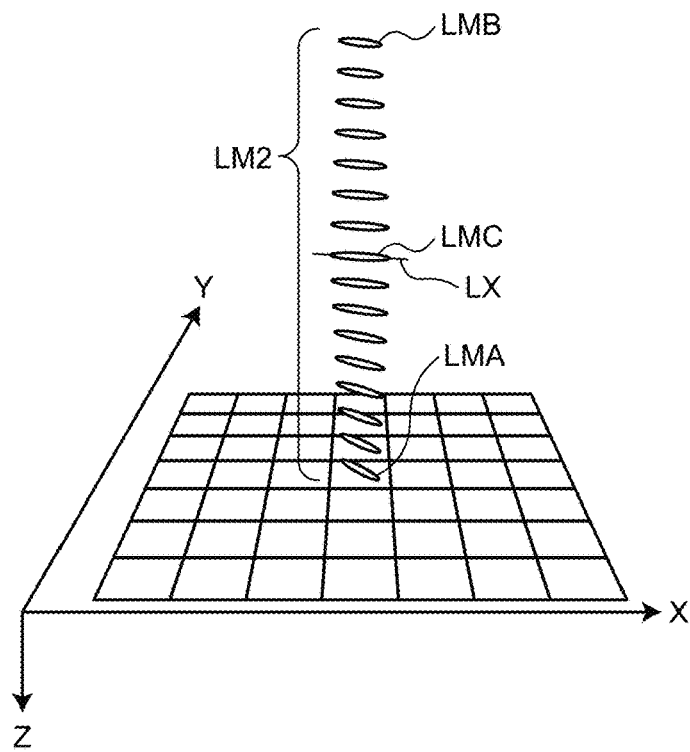
FIG. 5 is a diagram illustrating the orientations of liquid crystal molecules when a liquid crystal panel is not in operation (OFF)
Figure 6:
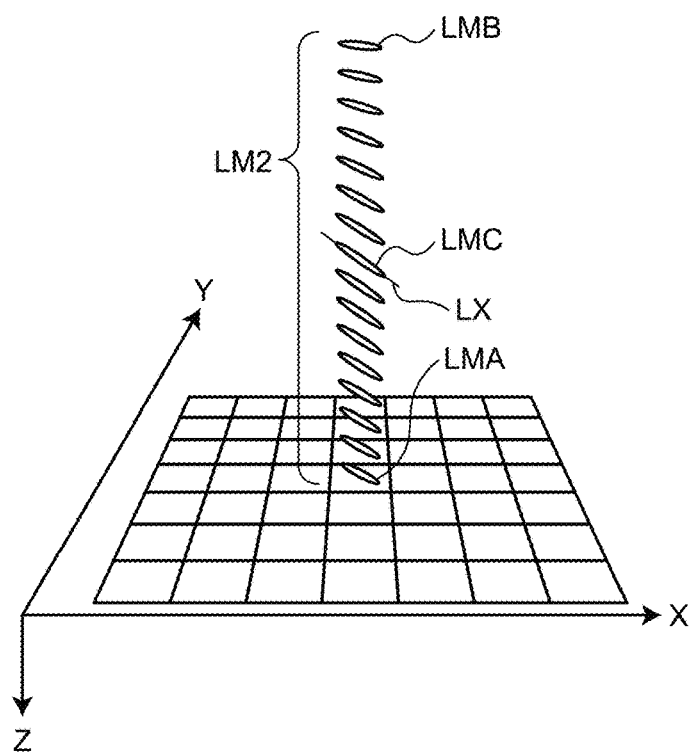
FIG. 6 is a diagram illustrating the orientations of liquid crystal molecules when a liquid crystal panel is in operation (ON)

The rubbing directions of the alignment films 23a and 24a affect the orientations of liquid crystal molecules contained in the liquid crystal LM. In FIG. 4 and FIGS. 5 and 6 to be described later, liquid crystal molecules LM2 are illustrated as liquid crystal molecules contained in the liquid crystal LM. Among the liquid crystal molecules LM2, a liquid crystal molecule positioned on the alignment film 23a side and oriented in the rubbing direction R06b is specially illustrated as a liquid crystal molecule LMB. Among the liquid crystal molecules LM2, a liquid crystal molecule positioned on the alignment film 24a side and oriented in the rubbing direction R06a is specially illustrated as a liquid crystal molecule LMA. Among the liquid crystal molecules LM2, a liquid crystal molecule at an approximately intermediate position between the liquid crystal molecule LMA and the liquid crystal molecule LMB in the third direction Z is specially illustrated as a liquid crystal molecule LMC.

As illustrated in FIG. 4, among the liquid crystal molecules LM2, those closer to the alignment film 23a are oriented in directions closer to the rubbing direction R06b and those closer to the alignment film 24a are oriented in directions closer to the rubbing direction R06a when viewed at a viewpoint of viewing an X-Y plane from the front. With such continuity of change in liquid crystal molecule orientation across the liquid crystal molecules LM2 arranged in the third direction z, the liquid crystal panel 20 applies the change of +90° to polarized light passing therethrough from the one side in the third direction Z to the other side.

FIG. 5 is a diagram illustrating the orientations of the liquid crystal molecules LM2 when the liquid crystal panel 20 is not in operation (OFF). FIG. 6 is a diagram illustrating the orientations of the liquid crystal molecules LM2 when the liquid crystal panel 20 is in operation (ON). As described above, the liquid crystal panel 20 is a liquid crystal panel of the TN type. Accordingly, when the liquid crystal panel 20 is not in operation (OFF), a long axis direction LX of each liquid crystal molecule LM2 is substantially aligned with an X-Y plane as illustrated in FIG. 5. When the liquid crystal panel 20 is in operation (ON), the orientation of each liquid crystal molecule LM2 changes in accordance with the potential difference between the electrodes FE2 and FE1 (refer to FIG. 2) so that the long axis direction LX is closer to the third direction Z direction. Accordingly, when the liquid crystal panel 20 is in operation (ON), the long axis direction LX of each liquid crystal molecule LM2 intersects an X-Y plane as illustrated in FIG. 6.

When the liquid crystal panel 20 is not in operation (OFF) as described above with reference to FIG. 5, the transmission degree of light on one side in the first direction X is hardly different from that on the other side in the first direction X. Specifically, when the first liquid crystal panel 20A and the second liquid crystal panel 20B are both not in operation (OFF) and an image DSP (refer to FIG. 9) on the display device 1 is viewed from each of two viewpoints that are line symmetric in the first direction X with respect to a viewpoint of viewing the display device 1 from the front, the brightnesses of the image recognized at the two viewpoints are substantially equal to each other. Hereinafter, the phrase "image DSP" means an image displayed and output by the display panel 30 of the display device 1. In this case, at a viewpoint of viewing the display device 1 from the front, the image can be viewed with a brightness equal to or higher than brightnesses at other viewpoints. In other words, when the liquid crystal panel 20 is not in operation (OFF), the transmission degree of light along the third direction Z through the liquid crystal panel 20 is equal to or larger than the transmission degree of light intersecting the third direction Z through the liquid crystal panel 20.

When the liquid crystal panel 20 is in operation (ON) as described above with reference to FIG. 6, the transmission degree of light on the one side in the first direction X is different from that on the other side in the first direction X. The following describes a view angle characteristic of the display device 1, which is obtained in accordance with the transmission degree of light when the liquid crystal panel 20 is in operation (ON), with reference to FIG. 7.

Figure 7:
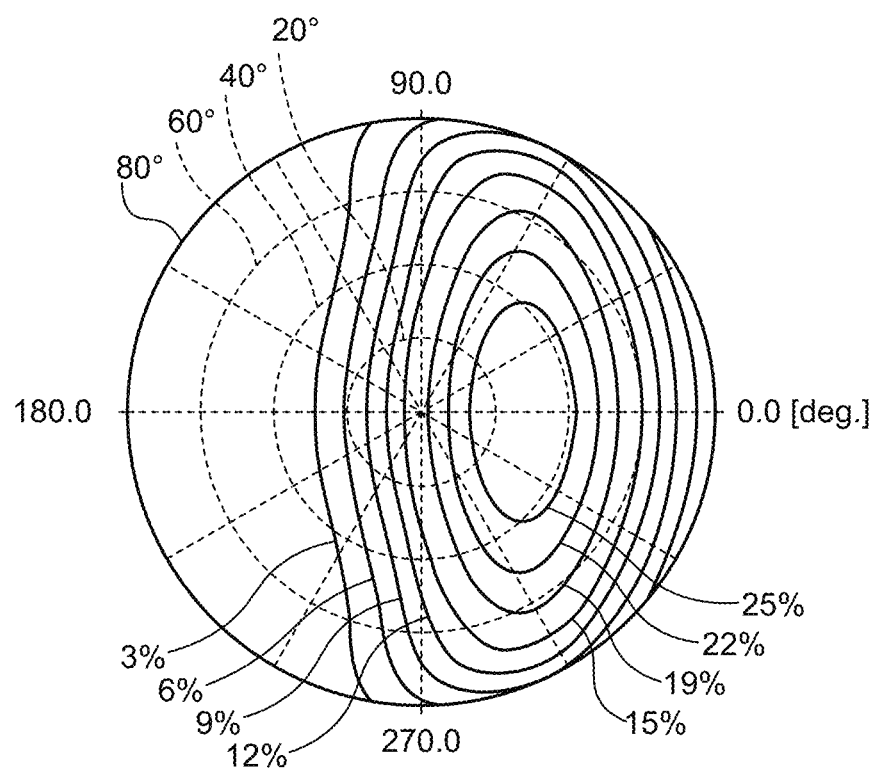
FIG. 7 is a diagram illustrating an exemplary view angle characteristic of the display device that is obtained in accordance with the transmission degree of light when a liquid crystal panel is in operation (ON)

FIG. 7 is a diagram illustrating an exemplary view angle characteristic of the display device 1 that is obtained in accordance with the transmission degree of light when the liquid crystal panel 20 is in operation (ON). The center of concentric circles in FIG. 7 corresponds to the normal of the display device 1 in the third direction Z, and the concentric circles centered at the normal indicate tilt angles of 20°, 40°, 60°, and 80°, respectively, with respect to the normal. This illustrated characteristic diagram is obtained by connecting regions of transmittances in respective directions that are equal to each other.

As illustrated in FIG. 7, relatively high transmittance of light is obtained when user's line of sight toward the display device 1 is tilted toward one side (0°) in the first direction X. Relatively high transmittance of light is also obtained when user's line of sight toward the display device 1 is aligned with the normal direction, in other words, when the user views the display device 1 from the front. However, when user's line of sight toward the display device 1 is tilted toward the other side (180°) in the first direction X, the transmittance of light significantly decreases as compared to the case of tilt toward the one side. In particular, when the tilt angle of the line of sight toward the other side (180°) in the first direction X is exceeds 30°, the transmittance is 3% or lower in the example illustrated in FIG. 7 and the brightness is so low that the image substantially cannot be viewed by a human.

The view angle characteristic described above with reference to FIG. 7 can be utilized for display output control intended to allow a user viewing the display device 1 from the front or viewing the display device 1 from the one side in the first direction X to view the image but not to allow a user viewing the display device 1 from the other side in the first direction X to view the image. An example in which such a display output control is applied will be described below with reference to FIG. 8.

Figure 8:
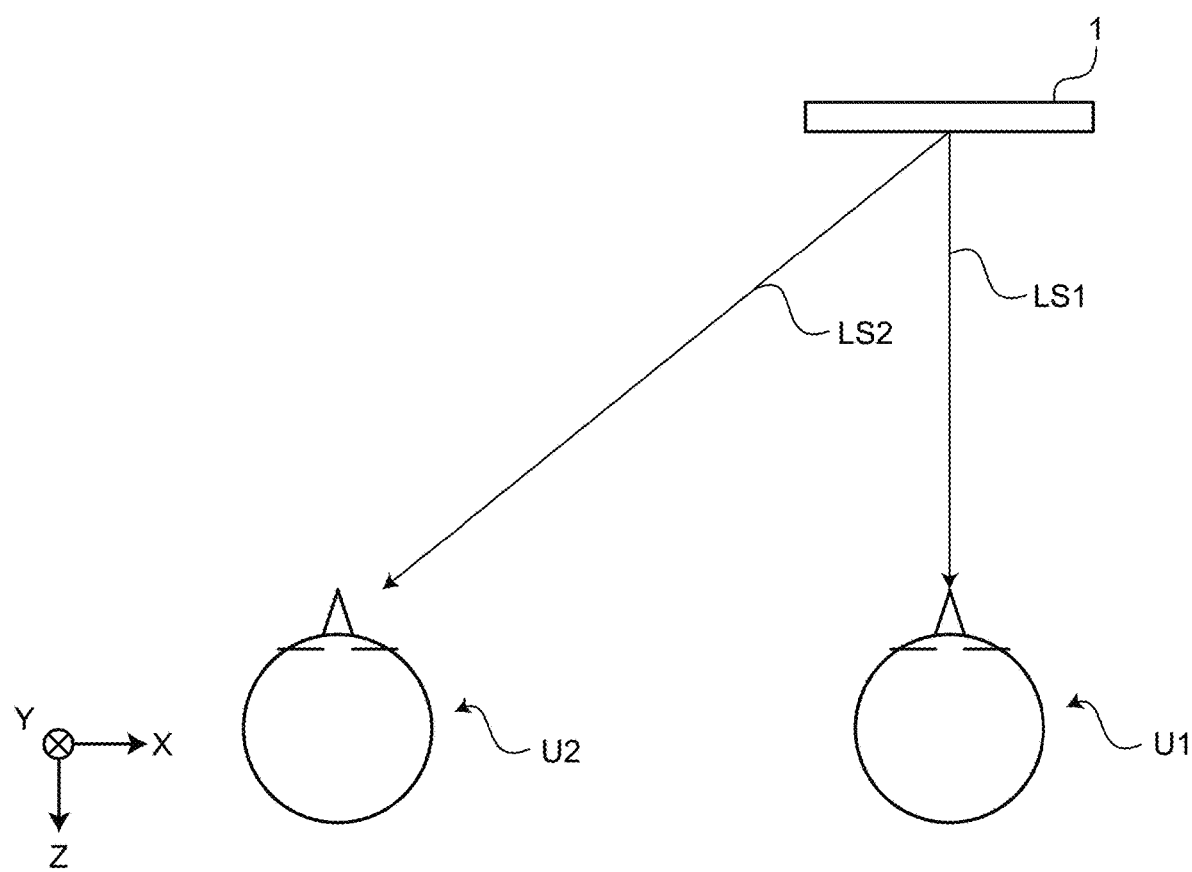
FIG. 8 is a schematic diagram illustrating an example of the relation between the display device, a user who can view an image regardless of whether each liquid crystal panel is in operation or not in operation (ON or OFF), and a user who cannot view the image when each liquid crystal panel is in operation (ON)

FIG. 8 is a schematic diagram illustrating an example of the relation between the display device 1, a user U1 who can view the image DSP regardless of whether each liquid crystal panel 20 is in operation or not in operation (ON or OFF), and a user U2 who cannot view the image DSP when each liquid crystal panel 20 is in operation (ON).

As illustrated in FIG. 8, the display device 1 and the user U1 face each other in the third direction Z. Although not illustrated in FIG. 8, the other surface side of the display device 1, in other words, the fifth polarization layer 42 side is the user U1 side in FIG. 8. Thus, in display output by the display device 1, light LS1 of the image toward the user U1 is along the third direction Z. In such a positional relation the display device 1 and the user U1, it can be expressed that the user U1 is located at a viewpoint of viewing the display device 1 from the front. The user U2 is located at a position of obliquely viewing the other surface side of the display device 1 in a direction tilted toward the other side in the first direction X relative to the third direction Z. In other words, in display output by the display device 1, light LS2 of the image toward the user U2 is tilted toward the other side (180° in FIG. 7) in the first direction X. In such a positional relation the display device 1 and the user U2, it can be expressed that the user U2 is located at a viewpoint of obliquely viewing the display device 1.

A case where the positional relation between the display device 1 and the users U1 and U2 as illustrated in FIG. 8 is established is, for example, a case where the display device 1 is provided in a four-wheel automobile in which the user U2 is seated in the driver seat and the user U1 is seated in the front passenger seat, but is not limited thereto. The positional relation can be established, for example, in a case where the display device 1 is provided as a personal monitor for each passenger on an aircraft such as a passenger airplane, and any other case may be included.

Figure 9:
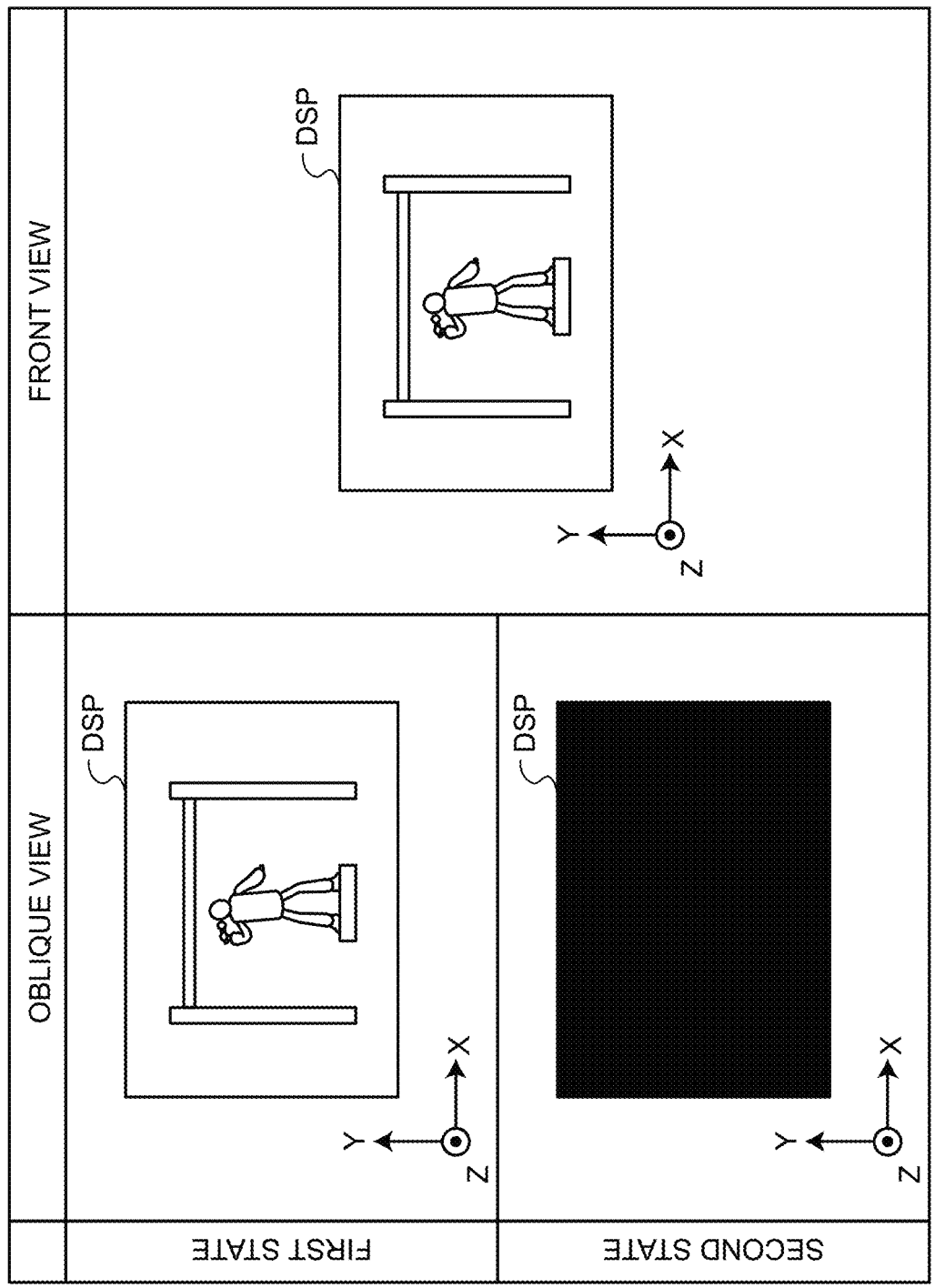
FIG. 9 is a schematic view illustrating a difference in the images viewed by a user viewing the display device from the front and a user obliquely viewing the display device.

FIG. 9 is a schematic view illustrating a difference in the images DSP viewed by a user viewing the display device 1 from the front and a user obliquely viewing the display device 1. The user viewing the display device 1 from the front is, for example, the user U1 in FIG. 8. The user obliquely views the display device 1 is, for example, the user U2 in FIG. 8. In description with reference to FIG. 9, a state of the display device 1 in which the display panel 30 performs the image display and the liquid crystal panel 20 is not in operation (OFF) is referred to as a first state. Such a state of the display device 1 that image display output by the display panel 30 is performed and the liquid crystal panel 20 is in operation (ON) is referred to as a second state.

As described above, a degree that light along the third direction Z passes through the liquid crystal panel 20 when the liquid crystal panel 20 is not in operation (OFF) is equal to or larger than a degree that light intersecting the third direction Z passes through the liquid crystal panel 20. As described above with reference to FIG. 7, when a user views the display device 1 from the front, relatively high transmittance of light is obtained even while the liquid crystal panel 20 is in operation (ON). Thus, a user viewing the display device 1 from the front can view the image DSP illustrated in FIG. 9 irrespective of whether the operation state of the display device 1 is the first state or the second state. The aspect of the image DSP illustrated in FIG. 9 is merely exemplary and the present disclosure is not limited thereto. The display panel 30 may display and output any desired image.

As described above with reference to FIG. 7, when user's line of sight toward the display device 1 is tilted toward the other side (180°) in the first direction X while the liquid crystal panel 20 is in operation (ON), transmittance of light significantly decreases as compared to the case of tilt toward the one side. Thus, a user obliquely viewing the display device 1 from the other side in the first direction X substantially cannot view the image DSP when the operation state of the display device 1 is the second state. However, when the operation state of the display device 1 is the first state, such significant decrease in the transmittance of light as described above with reference to FIG. 7 does not occur even for the other side (180°) in the first direction X. Thus, when the operation state of the display device 1 is in the first state, a user obliquely viewing the display device 1 from the other side in the first direction X can view substantially the same image DSP as that for a user viewing the display device 1 from the front.

As illustrated in FIG. 9, the image DSP is viewed as a rectangular image. Accordingly, the display region AA has a rectangular shape corresponding to the image DSP illustrated in FIG. 9 when the display device 1 is viewed from the front. Two sides of the four sides of the rectangle extend along the first direction X, and the other two sides extend along the second direction Y. The light adjuster 10 of the embodiment causes the transmission degree of light along a line tilted toward one side in the longitudinal direction of the rectangle (the first direction X) with respect to the third direction Z and the transmission degree of light along a line tilted toward the other side in the longitudinal direction to be different from each other. Accordingly, the light adjuster 10 generates the difference in viewing between the first and second states described above with reference to FIG. 9.

As described above, the light adjuster 10 includes the first liquid crystal panel 20A provided as an E-mode liquid crystal panel and the second liquid crystal panel 20B provided as an O-mode liquid crystal panel. Optical characteristics attributable to mixture of the E-mode liquid crystal panel and the O-mode liquid crystal panel will be described below with reference to FIGS. 10 to 12.

Figure 10:
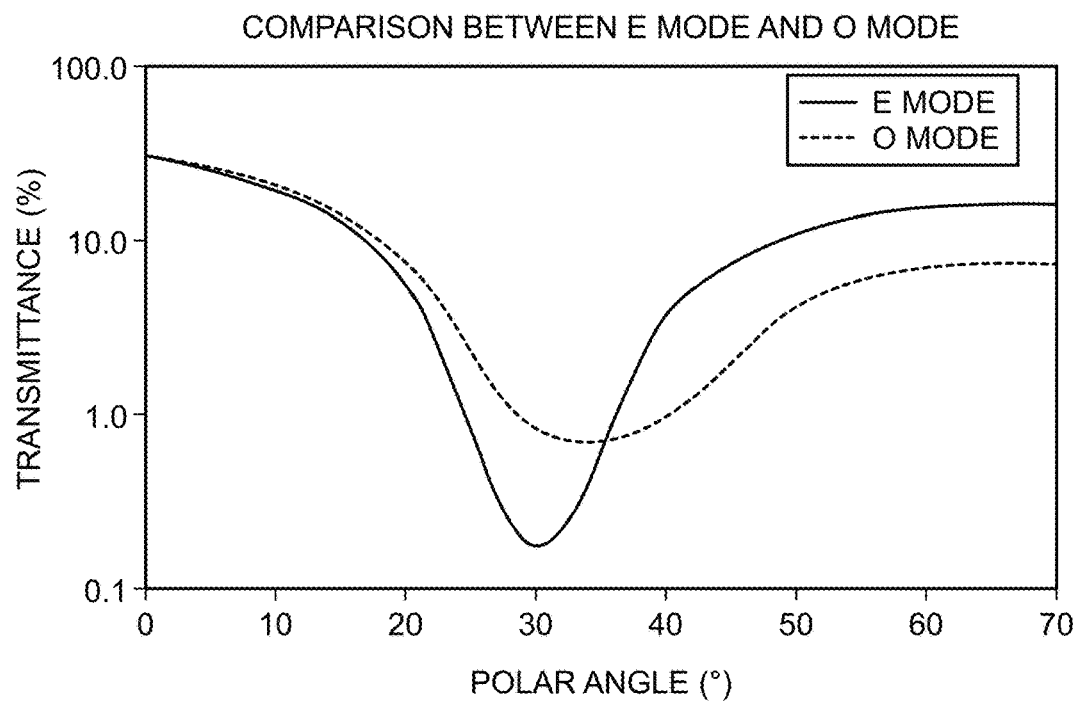
FIG. 10 is a graph illustrating the relation between a polar angle and the transmittance of light when an E-mode or O-mode liquid crystal panel is in operation (ON)

FIG. 10 is a graph illustrating the relation between a polar angle and the transmittance of light when the E-mode or O-mode liquid crystal panel 20 is in operation (ON). The horizontal axis (polar angle) in FIG. 10 and FIG. 14 to be described later represents the angle between the line of light tilted toward the other side in the first direction X (180.0 side in FIG. 7) in the description with reference to FIG. 7 and a reference (0°) that is an angle aligned with the third direction Z. The vertical axis (transmittance) represents the transmittance of light along a line corresponding to the polar angle represented by the horizontal axis.

As illustrated in FIG. 10, the relation between the polar angle and the transmittance of light when the liquid crystal panel 20 is in operation (ON) is different between the liquid crystal panel 20 (for example, the first liquid crystal panel 20A) provided as an E-mode liquid crystal panel and the liquid crystal panel 20 (for example, the second liquid crystal panel 20B) provided as an O-mode liquid crystal panel. Specifically, the graph illustrating the relation between the polar angle and the transmittance of the liquid crystal panel 20 provided as an E-mode liquid crystal panel has a deep valley shape in which the transmittance significantly decreases to less than 1% with a peak at the polar angle of 30°. However, the graph illustrating the relation between the polar angle and the transmittance of the liquid crystal panel 20 provided as an O-mode liquid crystal panel has a relatively gentle basin shape as compared to the E-mode graph, in which the transmittance is substantially 1% approximately between the polar angle of 30° and the polar angle of 40°.

The difference in optical characteristics between the E and O modes as described above with reference to FIG. 10 can be utilized to achieve a view angle characteristic that is more suitable for prevention of viewing of the image DSP on the display device 1 in the second state from the other side in the first direction X. Specifically, the light adjuster 10 includes one liquid crystal panel 20 (for example, the first liquid crystal panel 20A) provided as an E-mode liquid crystal panel and one liquid crystal panel 20 provided as an O-mode liquid crystal panel (for example, the second liquid crystal panel 20B) as described above with reference to FIGS. 3 and 4. Thus, it is possible to more reliably prevent viewing of the image DSP on the display device 1 in the second state from the other side in the first direction X.

Figure 11:
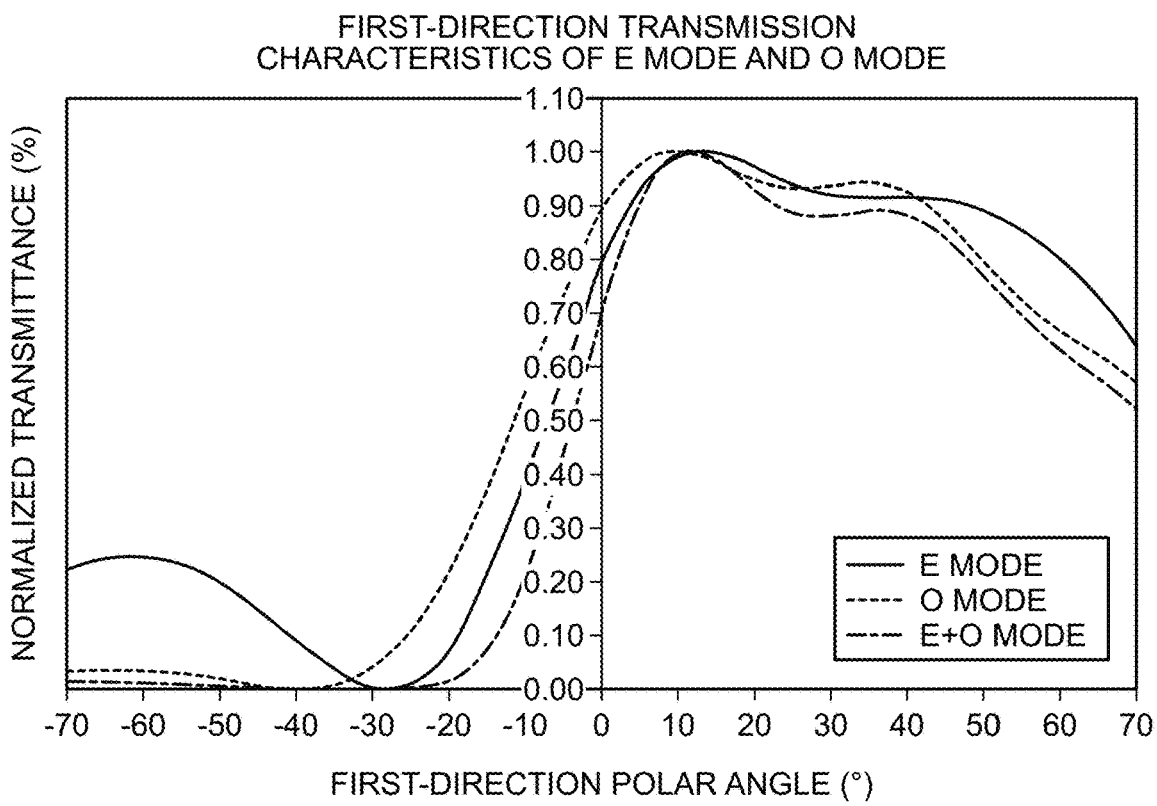
FIG. 11 is a graph illustrating the normalized transmittance of the display device in a second state when the display device includes the E-mode liquid crystal panel only, the O-mode liquid crystal panel only, or a combination of the E-mode liquid crystal panel and the O-mode liquid crystal panel.
Figure 12:
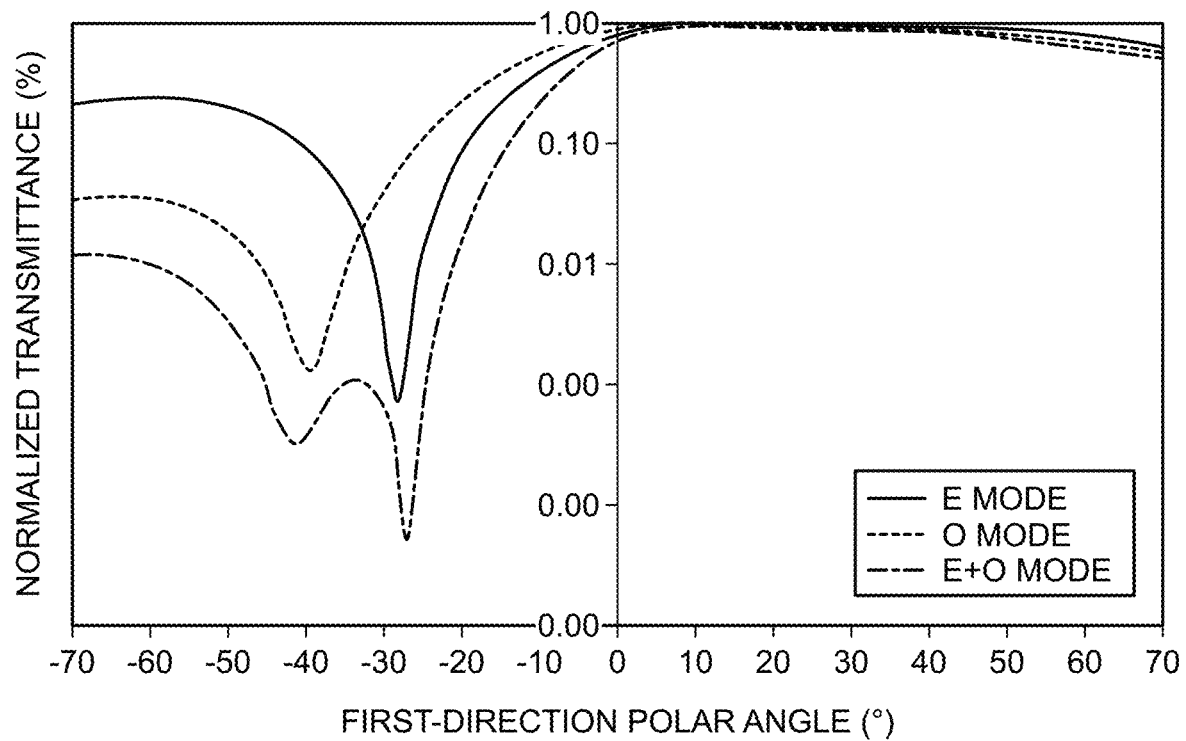
FIG. 12 is a graph illustrating the normalized transmittance of the display device in the second state when the display device includes the E-mode liquid crystal panel only, the O-mode liquid crystal panel only, or the combination of the E-mode liquid crystal panel and the O-mode liquid crystal panel.

FIGS. 11 and 12 are graphs illustrating the normalized transmittance of the display device 1 in the second state when the display device includes the E-mode liquid crystal panel only, the O-mode liquid crystal panel only, or a combination of the E-mode liquid crystal panel and the O-mode liquid crystal panel. "E MODE" illustrates a case of the E-mode liquid crystal panel only, in other words, a configuration in which the light adjuster 10 includes only the E-mode liquid crystal panel. "O MODE" illustrates a case of the O-mode liquid crystal panel only, in other words, a configuration in which the light adjuster 10 includes only the O-mode liquid crystal panel. "E+O MODE" illustrates a case of the combination of the E- and O-mode liquid crystal panels, in other words, a configuration in which the light adjuster 10 includes both the E-mode liquid crystal panel and O-mode liquid crystal panel as in the embodiment.

The normalized transmittance is a value of 0.0 to 1.0, which expresses the brightness of the image DSP that can be viewed by a user. The value of 1.0 is set as the brightness of the image at a view angle at which the image can be viewed brightest when the display device 1 is in operation, and the value of 0.0 is set as the brightness in a state with no light from the light source 60 (when the display device 1 is not in operation).

Figure 15:
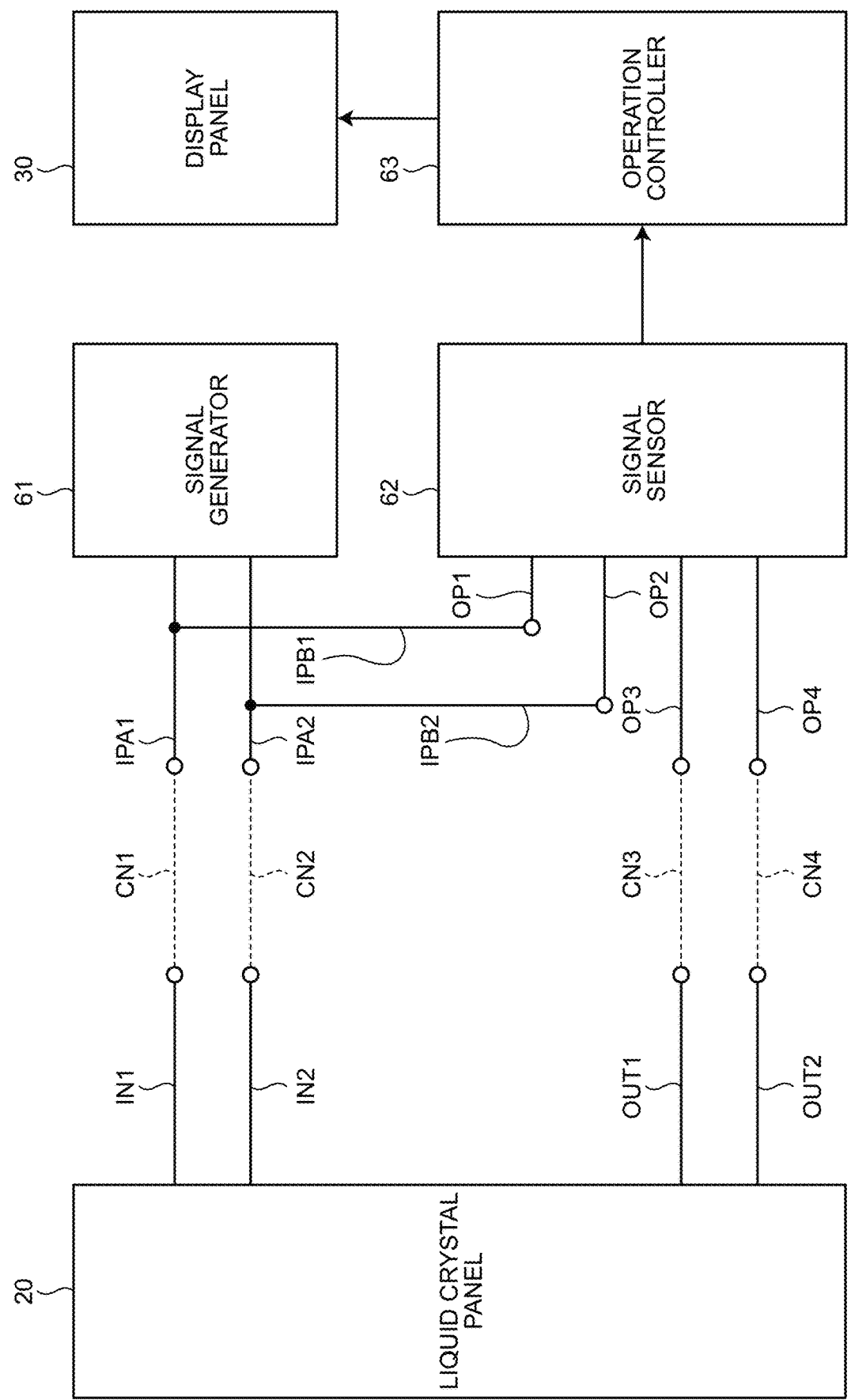
FIG. 15 is a block diagram illustrating components coupled to wiring lines IN1, IN2, OUT1, and OUT2.
Figure 16:
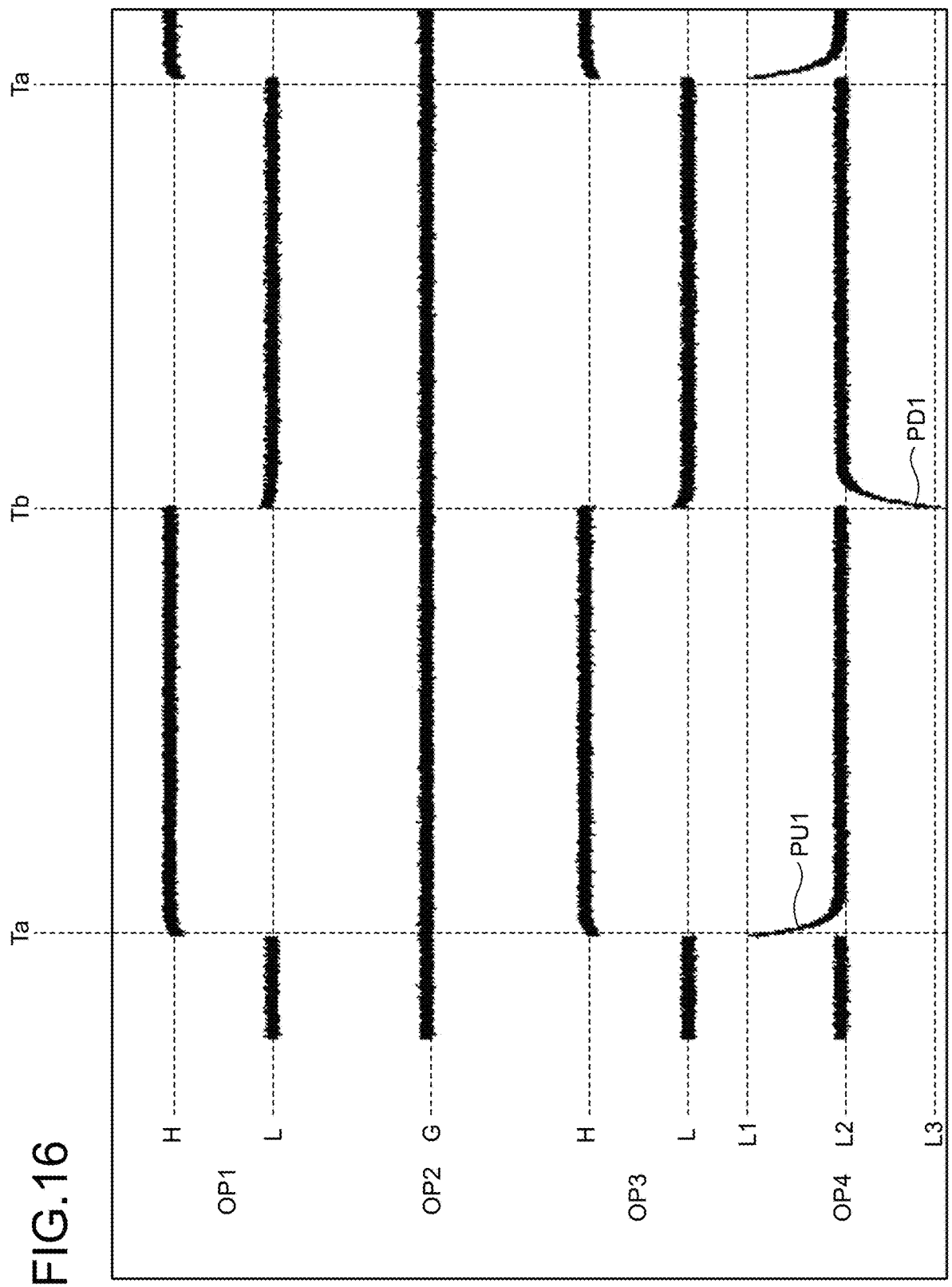
FIG. 16 is a graph illustrating an example of input from terminals OP1, OP2, OP3, and OP4 when the signal transmission paths to the electrodes FE1 and FE2 are normal.
Figure 17:
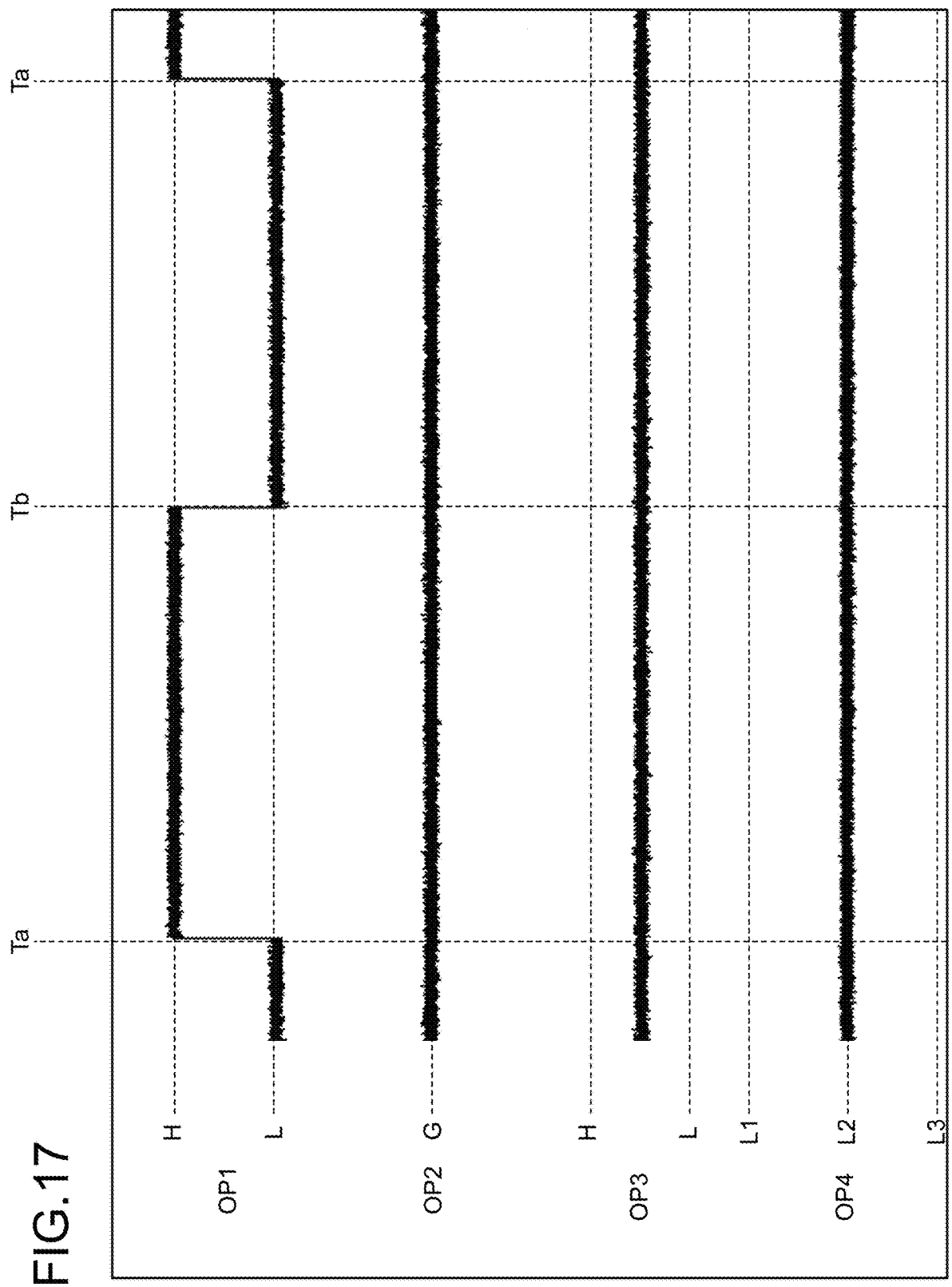
FIG. 17 is a waveform diagram illustrating an example of the input from the terminals OP1, OP2, OP3, and OP4 when coupling between a signal input path line IPA1 and the wiring line IN1 through a coupling line CN1 is disconnected.
Figure 18:
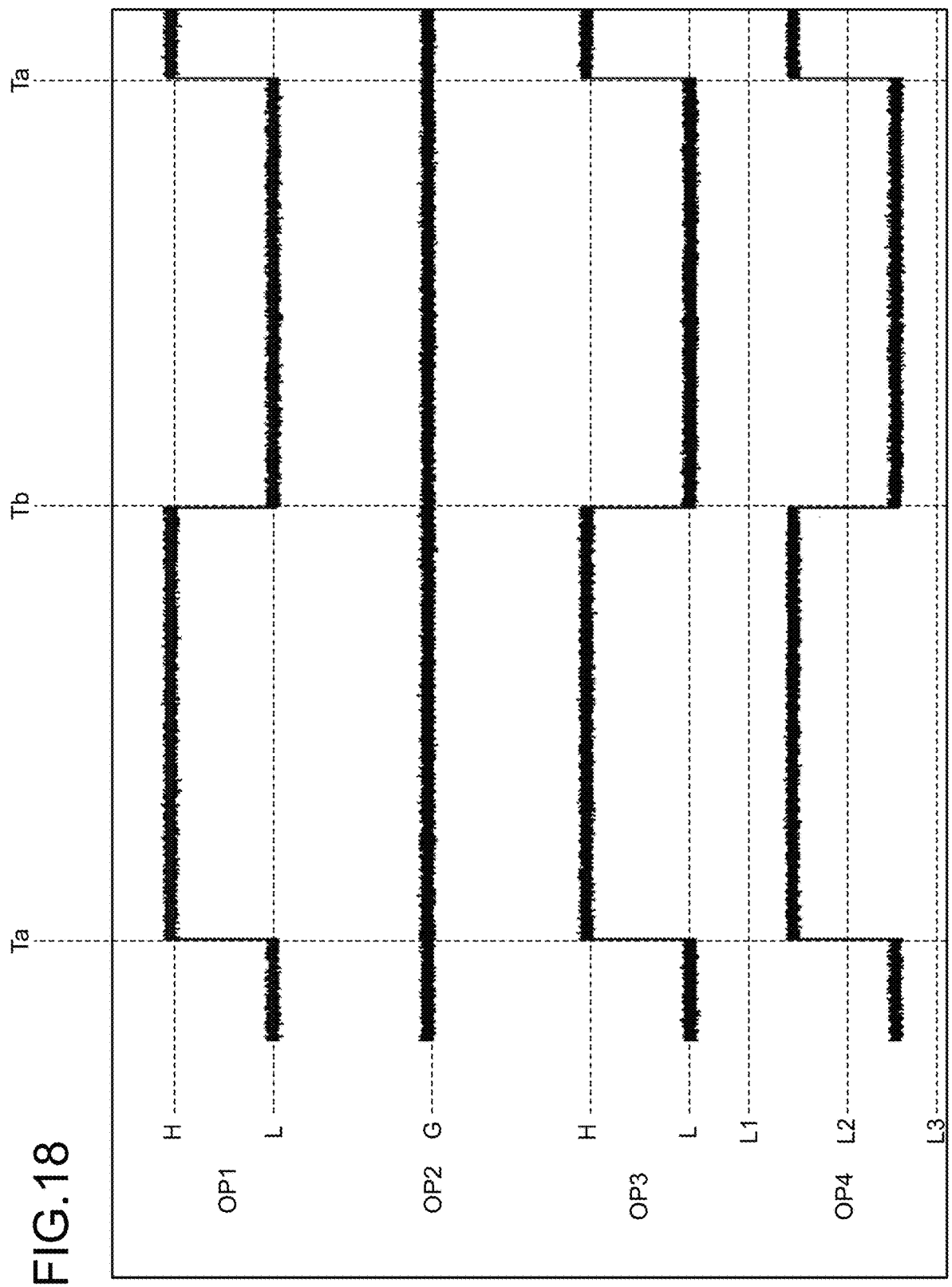
FIG. 18 is a waveform diagram illustrating an example of the input from the terminals OP1, OP2, OP3, and OP4 when coupling between a signal input path line IPA2 and the wiring line IN2 through a coupling line CN2 is disconnected, when the signal output path line OUT1 and the signal output path line OUT2 are short-circuited, when the wiring line IN2 and the signal output path line OUT1 are short-circuited, or when the wiring line IN1 and the signal output path line OUT2 are short-circuited.

In FIG. 11 and FIGS. 15 and 17 to be described later, the normalized transmittance of 0.00 to 1.00 is illustrated at equal intervals in the vertical axis direction. In FIG. 12 and FIGS. 16 and 18 to be described later, the value of the normalized transmittance is 1.0 at the upper end in the vertical axis direction and decreases by $1/10$ in each scale downward. The illustrated relation between the view angle and the normalized transmittance is the same between FIGS. 11 and 12 except that the manner of expression in the vertical axis direction is different therebetween. In the horizontal axis direction in FIGS. 11 and 12 and FIGS. 15 to 18 to be described later, the line of sight at an angle tilted toward the one side in the first direction X with respect to a reference (view angle of 0°) at the line of sight when viewing the display device 1 from the front is regarded as a view angle of a positive (+) value, and the line of sight at an angle tilted toward the other side in the first direction X is regarded as a view angle of a negative (−) value.

In a case of a configuration in which the light adjuster 10 includes only the E-mode liquid crystal panel, the normalized transmittance is extremely close to 0 at the view angle of −30° but is 0.1 or larger at view angles on the positive (+) side of −20° and on the negative (−) side of −40°. In this manner, with the E-mode liquid crystal panel only, there remains the possibility that the image DSP unintentionally can be viewed when obliquely viewed if the view angle is even slightly deviated from −30°.

In a case of a configuration in which the light adjuster 10 includes only the O-mode liquid crystal panel, the normalized transmittance is approximately 0.1 or larger up to −25° approximately even when viewed from the other side in the first direction X. In this manner, with the O-mode liquid crystal panel only, reduction of viewing from the other side in the first direction X is potentially insufficient.

However, in a case of a configuration in which the light adjuster 10 includes both the E-mode and O-mode liquid crystal panels as in the embodiment, the normalized transmittance is significantly smaller than 0.1 when the view angle is on the negative side of −20°. Moreover, unlike the case of the E-mode liquid crystal panel only, the normalized transmittance is not 0.1 or larger even when the view angle is on the negative (−) side of −40°. In this manner, according to the embodiment, since the light adjuster 10 includes both the E-mode and O-mode liquid crystal panels, it is possible to more reliably reduce viewing of the image DSP on the display device 1 in the second state from the other side in the first direction X.

In the display device 1, the specific configuration of the display panel 30 that can be combined with the light adjuster 10 of the embodiment is not limited to the above-described liquid crystal panel of the IPS type. The display panel 30 may be a liquid crystal panel of another type as long as it is what is called a transmissive liquid crystal panel and includes a plurality of pixels in each of which the transmission degree of light is individually controllable in accordance with image data input from the outside. The following describes, with reference to FIG. 13, the configuration of pixels provided in a liquid crystal panel of the IPS type, which is employable as the display panel 30 of the embodiment.

Figure 13:
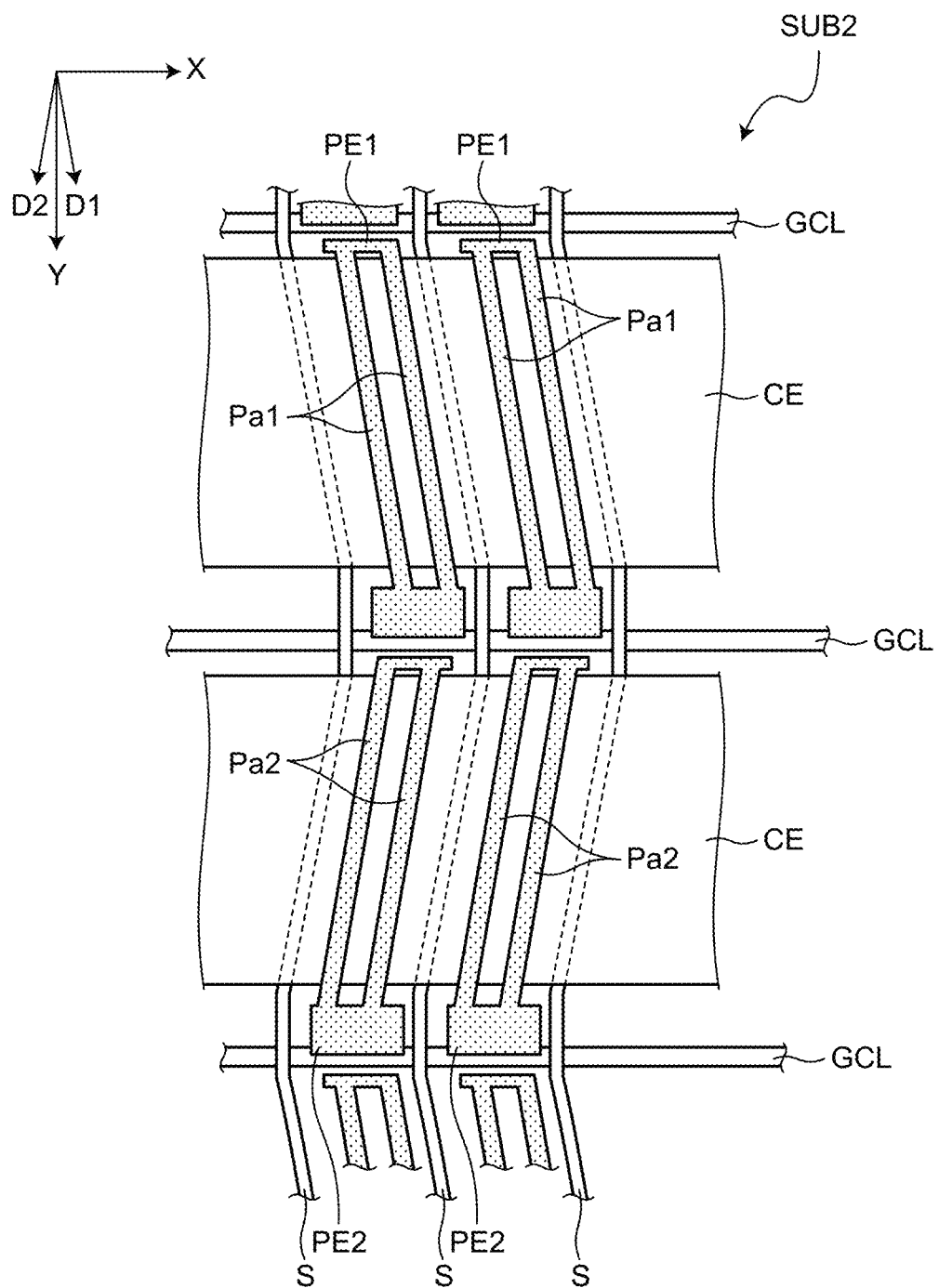
FIG. 13 is a plan view illustrating an example of a pixel arrangement in a display panel.

FIG. 13 is a plan view illustrating an example of a pixel arrangement in the display panel 30. FIG. 13 illustrates overlapping of pixel electrodes PE1 and PE2 and the common electrode CE when viewed from the fifth polarization layer 42 side. Each pixel electrode P described above with reference to FIG. 2 is the pixel electrode PE1 or PE2 in FIG. 13. The pixel substrate 31 includes a plurality of scanning lines GCL and a plurality of signal lines S. The scanning lines GCL each extend in the first direction X and are arranged at intervals in the second direction Y. The signal lines S each extend substantially in the second direction Y and are arranged at intervals in the first direction X.

A plurality of pixel electrodes PE are arranged in the first direction X. Each pixel electrode PE1 includes strip electrodes Pa1 overlap the common electrode CE. The strip electrodes Pa1 extend in a direction D1 different from the first direction X and the second direction Y. A plurality of pixel electrodes PE2 are arranged in the first direction X. Each pixel electrode PE2 includes strip electrodes Pa2 overlap the common electrode CE. The strip electrodes Pa2 extend in a direction D2 different from the direction D1. The numbers of strip electrodes Pa1 and Pa2 may be one or may be equal to or larger than three.

The following describes a function for verifying the operation of the liquid crystal panel 20 included in the display device 1. In the embodiment, a configuration is provided for checking whether a signal transmission path to the electrode FE1 and a signal transmission path to the electrode FE2 are normally established. The configuration will be described below with reference to FIGS. 14 to 25.

Figure 14:
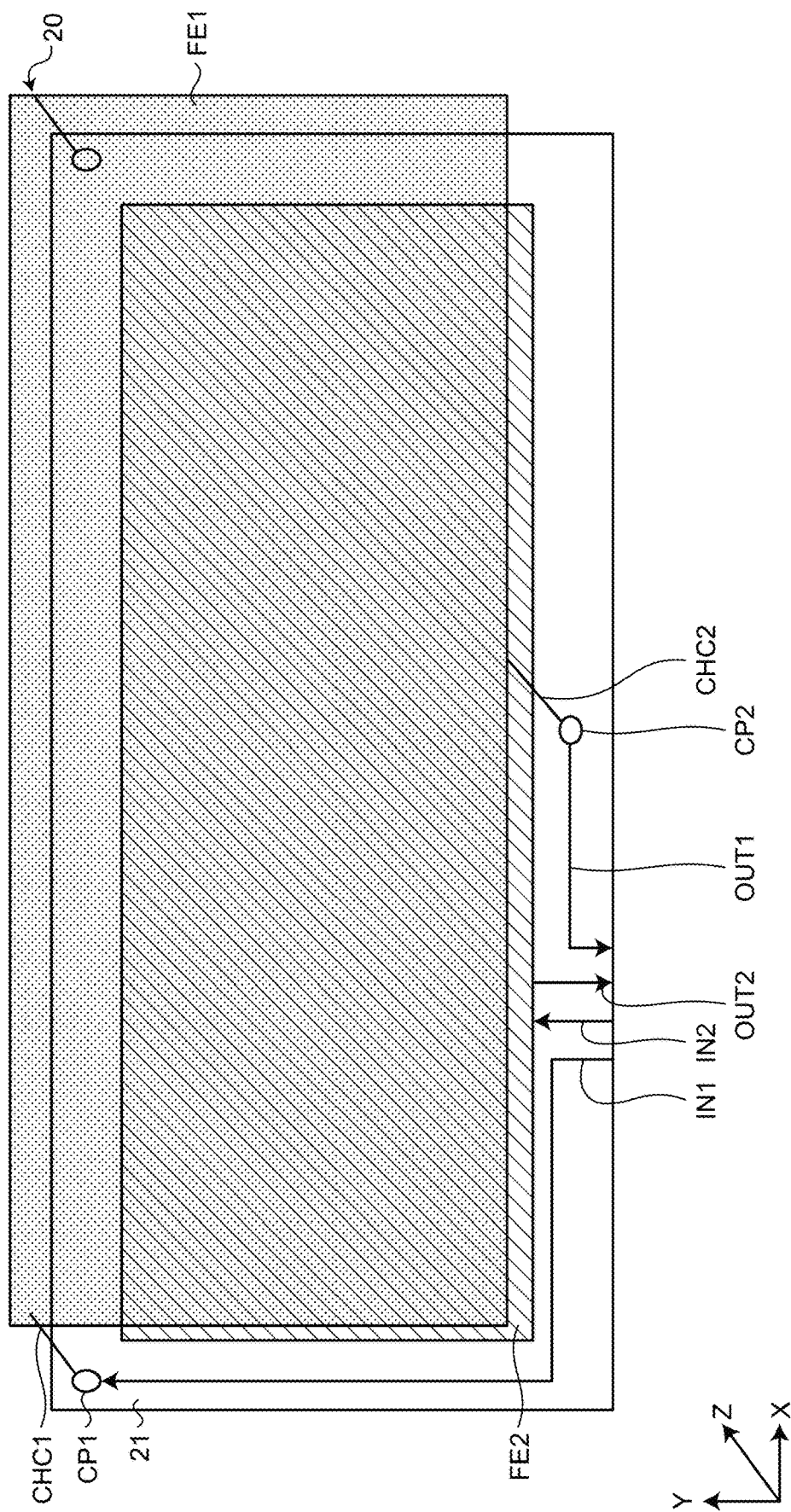
FIG. 14 is a schematic diagram illustrating a signal transmission path to an electrode FE1 and a signal transmission path to an electrode FE2.

FIG. 14 is a schematic diagram illustrating the signal transmission paths to the electrodes FE1 and FE2. As illustrated in FIG. 14, the electrode FE1 is coupled to a wiring line IN1 through a conductive layer CHC1. The electrode FE1 is also coupled to a signal output path line OUT1 through a conductive layer CHC2. The wiring line IN1 and the signal output path line OUT1 are, for example, wiring lines mounted on the first substrate 21.

The conductive layer CHC1 is a signal transmission path extending in the third direction Z and coupling the electrode FE1, which is mounted on a surface of the second substrate 22 on the first substrate 21 side, to the wiring line IN1. The conductive layer CHC2 is a signal transmission path extending in the third direction Z and coupling the electrode FE1 to a wiring line IN2. The conductive layer CHC1 and the conductive layer CHC2 are each, for example, a conductive layer formed in a hole (contact hole) penetrating the liquid crystal panel 20 in the third direction Z between the electrode FE1 and the first substrate 21 illustrated in FIG. 2.

As illustrated in FIG. 14, the electrode FE2 is coupled to the wiring line IN2 and a signal output path line OUT2. The wiring line IN2 and the signal output path line OUT2 are, for example, wiring lines mounted on the first substrate 21. The wiring lines IN1, IN2, OUT1, and OUT2 may be provided on the second substrate 22. In this case, the positional relation of the electrodes FE1 and FE2 may be inverted.

FIG. 15 is a block diagram illustrating components coupled to the wiring lines IN1, IN2, OUT1, and OUT2. As illustrated in FIG. 15, a signal generator 61 is coupled to the wiring lines IN1 and IN2. Specifically, the signal generator 61 has signal input path lines IPA1 and IPA2. The signal input path line IPA1 is coupled to the wiring line IN1 through a coupling line CN1. The signal input path line IPA2 is coupled to the wiring line IN2 through a coupling line CN2. As illustrated in FIG. 15, a branch line IPB1 branches off from the signal input path line IPA1. As illustrated in FIG. 15, a branch line IPB2 branches off from the signal input path line IPA2.

As illustrated in FIG. 15, a signal sensor 62 is coupled to the signal output path lines OUT1 and OUT2. Specifically, the signal sensor 62 has terminals OP1, OP2, OP3, and OP4. The terminal OP1 is coupled to the branch line IPB1. The terminal OP2 is coupled to the branch line IPB2. The terminal OP3 is coupled to the signal output path line OUT1 through a coupling line CN3. The terminal OP4 is coupled to the signal output path line OUT2 through a coupling line CN4.

The coupling lines CN1, CN2, CN3, and CN4 may be, for example, wiring lines provided on a flexible printed board on which the signal generator 61, the signal sensor 62, and an operation controller 63 to be described later are mounted, may be wiring lines provided at a connector coupling a substrate on which the signal generator 61, the signal sensor 62, and the operation controller 63 are mounted to the first substrate 21, or may be configured in any other form for transmitting signals.

The signal generator 61 is a circuit configured to output a carrier wave and a constant potential. Specifically, the signal generator 61 outputs a carrier wave in which signal strength varies periodically, from one (for example, the signal input path line IPA1) of the signal input path line IPA1 and the signal input path line IPA2. The carrier wave is, for example, a pulse signal such as a square wave and is not limited to but may be any carrier wave in which signal strength varies periodically in a predetermined manner and may be, for example, a sine wave. The signal generator 61 also outputs a constant potential from the other (for example, the signal input path line IPA2) of the signal input path line IPA1 and the signal input path line IPA2. The constant potential is, for example, ground potential but not limited thereto and only needs to be potential in which passive electric change is caused in the electrode FE2 upon application of the carrier wave output from the signal input path line IPA1 to the electrode FE1.

The signal sensor 62 is a circuit configured to sense input from the terminals OP1, OP2, OP3, and OP4. A carrier wave output from the signal input path line IPA1 and transmitted through the branch line IPB1 is input to the terminal OP1. Constant potential output from the signal input path line IPA2 and transmitted through the branch line IPB2 is input to the terminal OP2. Output from the signal output path line OUT1 coupled to the terminal OP3 through the coupling line CN3 is input to the terminal OP3. Output from the signal output path line OUT2 coupled to the terminal OP4 through the coupling line CN4 is input to the terminal OP4.

In this manner, the signal sensor 62 of the embodiment is coupled to signal input paths (the signal input path lines IPA1 and IPA2) and signal output paths (the signal output path lines OUT1 and OUT2). The signal input paths (the signal input path lines IPA1 and IPA2) couple the signal generator 61 to two electrodes (the electrodes FE1 and FE2). The signal output paths (the signal output path lines OUT1 and OUT2) are coupled to the two electrodes but are not coupled to the signal generator 61.

The output from the signal output path line OUT1 corresponds to the potential of the electrode FE1. The output from the signal output path line OUT2 corresponds to the potential of the electrode FE2.

The signal sensor 62 performs outputting to the operation controller 63 in accordance with input from the terminals OP1, OP2, OP3, and OP4. The operation controller 63 is a circuit configured to control the operation of the display panel 30.

The following describes the relation of a waveform diagram illustrating an example of the input from the terminals OP1, OP2, OP3, and OP4 with the signal transmission paths to the electrodes FE1 and FE2 with reference to FIGS. 16 to 25. Waveform diagrams illustrated in FIGS. 16 to 25 are waveform diagrams visualizing potential obtained at each of the terminals OP1, OP2, OP3, and OP4 by using an oscilloscope, and potential sensed by the signal sensor 62 is the same as that in the waveform diagrams.

FIG. 16 is a waveform diagram illustrating an example of the input from the terminals OP1, OP2, OP3, and OP4 when the signal transmission paths to the electrodes FE1 and FE2 are normal. The waveform diagrams of FIGS. 16 to 21 are waveform diagrams in a case where a square wave from the signal generator 61 is input to the wiring line IN1 and provided to the electrode FE1 and ground potential from the signal generator 61 is input to the wiring line IN2 and provided to the electrode FE2. In other words, in a case where the waveform diagrams of FIGS. 16 to 21 are obtained, a square wave is output from the signal input path line IPA1 of the signal generator 61, and ground potential is output from the signal input path line IPA2.

The case where a square wave is output from one of the signal input path lines IPA1 and IPA2 of the signal generator 61 and ground potential is output from the other is, for example, a case where the liquid crystal panel 20 is in operation (ON). In the embodiment, when the liquid crystal panel 20 is not in operation (OFF), an electric signal output to the signal input path line IPA1 is the same as an electric signal output to the signal input path line IPA2.

As described above, when a square wave is output from the signal input path line IPA1 of the signal generator 61, the square wave is transmitted to the terminal OP1 through the branch line IPB1. Accordingly, as illustrated in FIG. 16, a square wave appears at the terminal OP1 as a sensing result. In FIG. 16, a square wave that rises from a low level (L) to a high level (H) at timing Ta and falls from the high level (H) to the low level (L) at timing Tb later than the timing Ta is input to the terminal OP1. When ground potential is output from the signal input path line IPA2, the ground potential is transmitted to the terminal OP2 through the branch line IPB2. Accordingly, as illustrated in FIG. 16, ground potential G is sensed at the terminal OP2.

The square wave output from the signal input path line IPA1 is transmitted to the electrode FE1 through the coupling line CN1, the wiring line IN1, and the conductive layer CHC1 and then transmitted from the electrode FE1 to the terminal OP3 through the conductive layer CHC2, the signal output path line OUT1, and the coupling line CN3. Accordingly, as illustrated in FIG. 16, the same square wave as that at the terminal OP1 appears at the terminal OP3 as a sensing result.

The ground potential output from the signal input path line IPA2 is transmitted to the electrode FE2 through the coupling line CN2 and the wiring line IN2. Thus, the potential of the electrode FE2 is maintained at potential L2 corresponding to the ground potential during most of the time. However, the potential of the electrode FE2 temporarily rises to potential L1 higher than the ground potential along with the rise of the potential of the electrode FE1 from the low level (L) to the high level (H) at the timing Ta, and immediately returns to the potential L2 thereafter. In FIG. 16, a potential change that returns to the potential L2 immediately after rising from the potential L2 to the potential L1 is indicated as a potential change PU1. The potential of the electrode FE2 temporarily falls to potential L3 lower than the ground potential along with the fall of the potential of the electrode FE1 from the high level (H) to the low level (L) at the timing Tb, and immediately returns to the potential L2 thereafter. In FIG. 16, a potential change that immediately returns to the potential L2 after falling from the potential L2 to the potential L3 is indicated as a potential change PD1. The potential of the electrode FE2 involving the changes indicated as the potential changes PU1 and PD1 is transmitted to the terminal OP4 through the signal output path line OUT2 and the coupling line CN4. Accordingly, as illustrated in FIG. 16, a transition pattern of potential in which potential is maintained at the potential L2 corresponding to the ground potential during most of the time but involves changes such as the potential change PU1 at the timing Ta and the potential change PD1 at the timing Tb, appears at the terminal OP4 as a sensing result.

The above description with reference to FIG. 16 is made with the example of the input from the terminals OP1, OP2, OP3, and OP4 when the signal transmission paths to the electrodes FE1 and FE2 are normal, in other words, when the signal transmission paths illustrated in FIG. 15 are normally established. However, the input from the terminals OP1, OP2, OP3, and OP4 becomes different from that illustrated in FIG. 16 when the signal transmission paths become different from the signal transmission paths illustrated in FIG. 15 for some reason. The following describes an example of the input from the terminals OP1, OP2, OP3, and OP4, which is different from that illustrated in FIG. 16, with reference to FIGS. 17 to 21.

FIG. 17 is a waveform diagram illustrating an example of the input from the terminals OP1, OP2, OP3, and OP4 when coupling between the signal input path line IPA1 and the wiring line IN1 through the coupling line CN1 is disconnected. Even when coupling between the signal input path line IPA1 and the wiring line IN1 through the coupling line CN1 is disconnected, the inputting to the terminal OP1 through the branch line IPB1 branching off from the signal input path line IPA1 is the same as described above with reference to FIG. 16. Accordingly, as illustrated in FIG. 17, a square wave appears at the terminal OP1 as a sensing result. Even when coupling between the signal input path line IPA1 and the wiring line IN1 through the coupling line CN1 is disconnected, the inputting to the terminal OP2 is the same as described above with reference to FIG. 16. Thus, as illustrated in FIG. 17, the ground potential G is sensed at the terminal OP2.

However, when the coupling between the signal input path line IPA1 and the wiring line IN1 through the coupling line CN1 is disconnected, a square wave output from the signal input path line IPA1 is not transmitted to the electrode FE1. Accordingly, a square wave does not appear at the terminal OP3 as a sensing result unlike the case described above with reference to FIG. 16. In this case, as illustrated in FIG. 17, a constant potential is continuously detected at the terminal OP3. In this case, the potential of the electrode FE2 does not change in cooperation with the rise and fall of the potential of the electrode FE1. Accordingly, the transition pattern of potential changing to a potential (the potential L1 or the potential L3) deviated from the potential L2 does not appear at the terminal OP4 as a sensing result unlike the case described above with reference to FIG. 16. In this case, as illustrated in FIG. 17, a constant potential is continuously detected at the terminal OP4.

In the following description of FIGS. 18 to 21, description of the same detection result as in FIG. 16 will be basically omitted, and any detection result different from that in FIG. 16 will be described below. Any matter needed to be specially noted about the same detection result as in FIG. 16 will be supplementarily described.

FIG. 18 is a waveform diagram illustrating an example of the input from the terminals OP1, OP2, OP3, and OP4 when coupling between the signal input path line IPA2 and the wiring line IN2 through the coupling line CN2 is disconnected, when the signal output path lines OUT1 and OUT2 are short-circuited, when the wiring line IN2 and the signal output path line OUT1 are short-circuited, or when the wiring line IN1 and the signal output path line OUT2 are short-circuited. When the coupling between the signal input path line IPA2 and the wiring line IN2 through the coupling line CN2 is disconnected, the ground potential output from the signal input path line IPA2 is not transmitted to the electrode FE2. In this case, the potential of the electrode FE2 varies with potential change due to a square wave transmitted to the electrode FE1. Accordingly, in this case, the same square wave as that at the terminal OP3 appears at the terminal OP4 as a sensing result.

When the signal output path lines OUT1 and OUT2 are short-circuited, the same detection result as that at the terminal OP1 appears at the terminal OP4 as well. When the wiring line IN1 and the signal output path line OUT2 are short-circuited, the same detection result as that at the terminal OP3 appears at the terminal OP4 as well. When the wiring line IN2 and the signal output path line OUT1 are short-circuited, the same signal as that transmitted from the signal output path line OUT1 to the terminal OP3 through coupling between the wiring line IN2 and the signal output path line OUT1 is transmitted to the terminal OP4 through the wiring line IN2, the electrode FE2, the signal output path line OUT2, and the coupling line CN4. Accordingly, in this case as well, the same detection result as that at the terminal OP3 appears at the terminal OP4 as well. Thus, in any of those cases, as illustrated in FIG. 18, a square wave appears at the terminal OP4 as a detection result.

Figure 19:
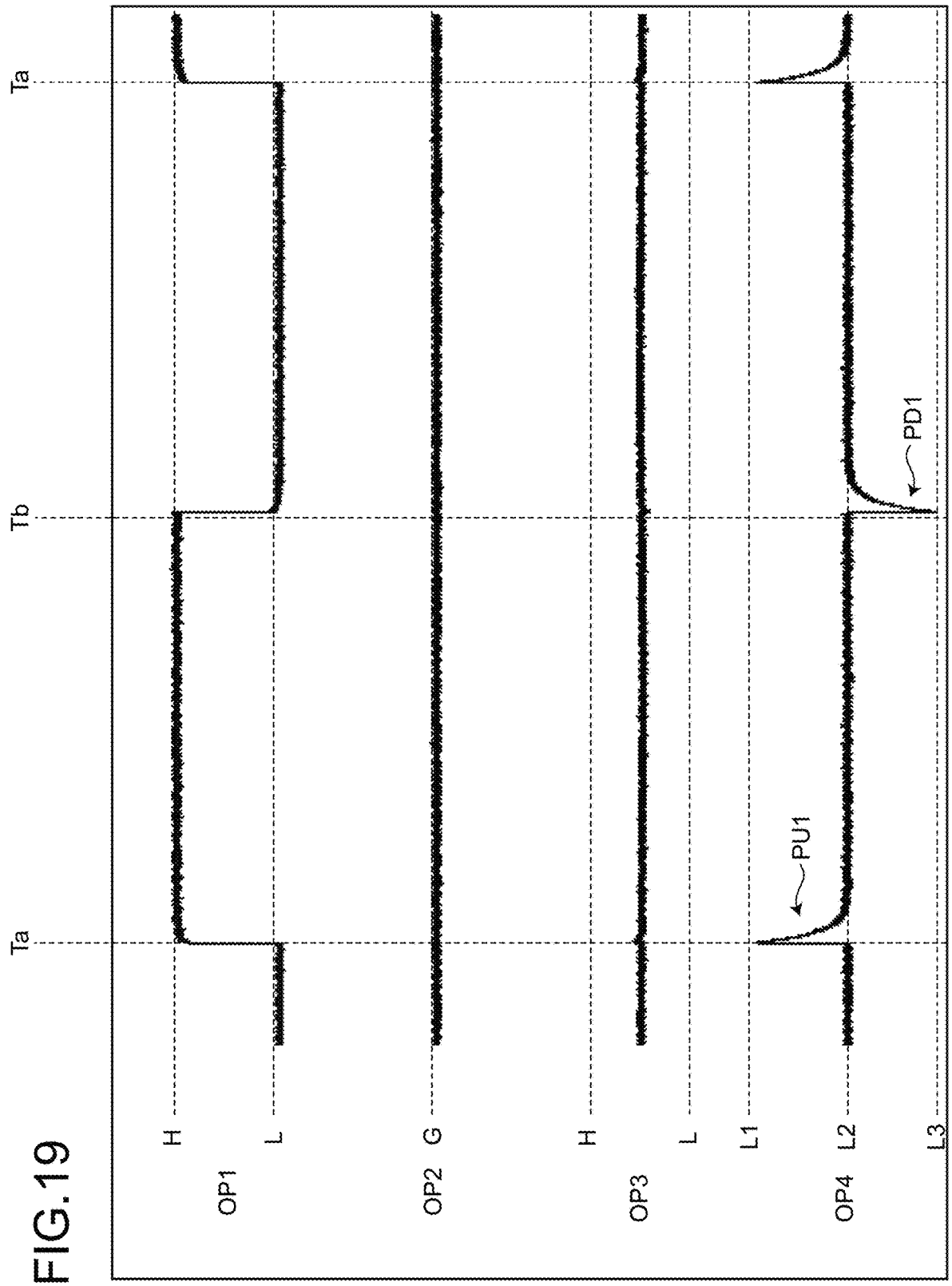
FIG. 19 is a waveform diagram illustrating an example of the input from the terminals OP1, OP2, OP3, and OP4 when coupling between the signal output path line OUT1 and the terminal OP3 through a coupling line CN3 is disconnected.

FIG. 19 is a waveform diagram illustrating an example of the input from the terminals OP1, OP2, OP3, and OP4 when coupling between the signal output path line OUT1 and the terminal OP3 through the coupling line CN3 is disconnected. When the coupling between the signal output path line OUT1 and the terminal OP3 through the coupling line CN3 is disconnected, potential change at the electrode FE1 is not transmitted to the terminal OP3. Accordingly, in this case, a constant potential is continuously detected at the terminal OP3 as illustrated in FIG. 19.

Since there is no problem with coupling between the signal input path line IPA1 and the wiring line IN1 and a square wave output from the signal input path line IPA1 is transmitted to the electrode FE1, change (the potential change PU1) in the potential of the electrode FE2 in accordance with the rise of the potential of the electrode FE1 at the timing Ta and change (the potential change PD1) in the potential of the electrode FE2 in accordance with the fall of the potential of the electrode FE1 at the timing Tb occurs as in the case described above with reference to FIG. 16. Accordingly, in this case as well, the same detection result as described above with reference to FIG. 16 appears at the terminal OP4.

In other words, in the example illustrated in FIG. 19, only the potential change occurring at the electrode FE1 is not transmitted to the terminal OP3, but change in the potential of the electrodes FE1 and FE2 due to transmittance of a square wave to the electrode FE1 occurs as in the case described above with reference to FIG. 16. Accordingly, as for the signal inputting from the signal generator 61 to the liquid crystal panel 20, the signal transmission paths function as in the example described above with reference to FIG. 16 even in the case described above with reference to FIG. 19.

Figure 20:
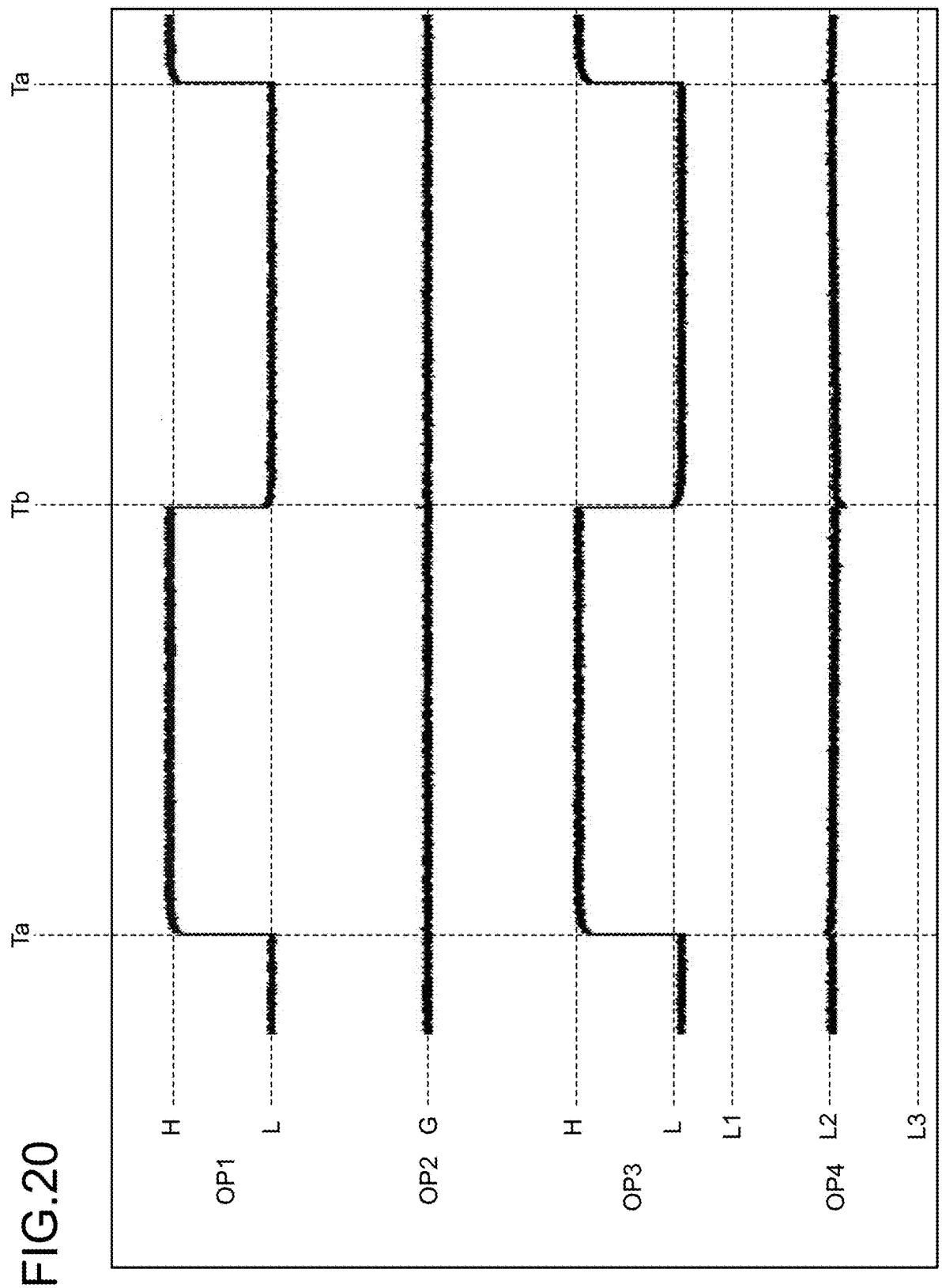
FIG. 20 is a waveform diagram illustrating an example of the input from the terminals OP1, OP2, OP3, and OP4 when coupling between the signal output path line OUT2 and the terminal OP4 through a coupling line CN4 is disconnected.

FIG. 20 is a waveform diagram illustrating an example of the input from the terminals OP1, OP2, OP3, and OP4 when coupling between the signal output path line OUT2 and the terminal OP4 through the coupling line CN4 is disconnected. When the coupling between the signal output path line OUT2 and the terminal OP4 through the coupling line CN4 is disconnected, potential change at the electrode FE2 is not transmitted to the terminal OP4. Accordingly, in this case, as illustrated in FIG. 20, a constant potential is continuously detected at the terminal OP4.

When there is no problem with coupling between the signal input path line IPA2 and the wiring line IN2 and the ground potential output from the signal input path line IPA2 is transmitted to the electrode FE2, the transition pattern of the potential of the electrode FE2 is the same as described above with reference to FIG. 16 even in the case described above with reference to FIG. 20.

However, in the example illustrated in FIG. 20, there is a possibility that the same change in the potential of the electrode FE2 as in the case described above with reference to FIG. 18 actually occurs, and thus it is thought to be difficult to definitely deny that the signal inputting to the electrodes FE1 and FE2 of the liquid crystal panel 20 is correctly performed, unlike the case described above with reference to FIG. 19.

Figure 21:
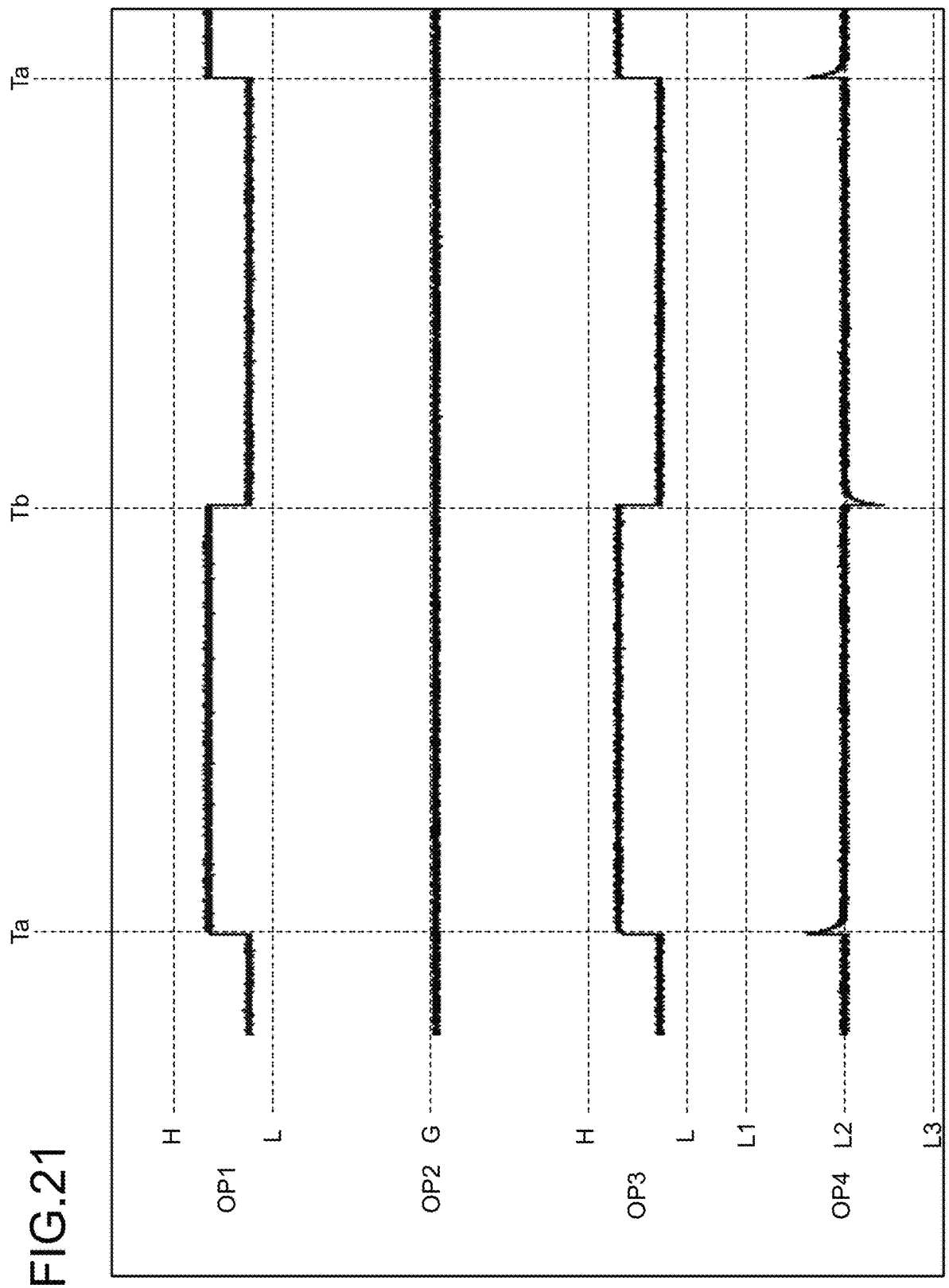
FIG. 21 is a waveform diagram illustrating an example of the input from the terminals OP1, OP2, OP3, and OP4 when the wiring lines IN1 and IN2 are short-circuited.

FIG. 21 is a waveform diagram illustrating an example of the input from the terminals OP1, OP2, OP3, and OP4 when the wiring lines IN1 and IN2 are short-circuited. When the wiring lines IN1 and IN2 are short-circuited, the degree of change in the potential of the electrode FE1 due to a square wave transmitted from the signal input path line IPA1 to the wiring line IN1 decreases. Accordingly, as illustrated in FIG. 21, the upper and lower peaks of square waves in the detection results at the terminals OP1 and OP3 do not reach the high level (H) and the low level (L). In other words, when square waves having upper and lower peaks not reaching the high level (H) and the low level (L) appear at the terminals OP1 and OP3 as detection results as illustrated in FIG. 21, it can be assumed that there is a high probability that the wiring lines IN1 and IN2 are short-circuited and problems occur in signal transmission paths related to the signal inputting to the electrodes FE1 and FE2.

The operation controller 63 controls the operation of the display panel 30 based on the sensing results of electric signals by the signal sensor 62. Specifically, the operation controller 63 determines whether the liquid crystal panel 20 is normally operating based on the electric signals sensed through the signal input paths (the signal input path lines IPA1 and IPA2) and electric signals detected through the signal output paths (the signal output path lines OUT1 and OUT2).

More specifically, in a case where any of the examples of FIGS. 16 to 21 is detected by the signal sensor 62, the operation controller 63 determines that the liquid crystal panel 20 is normally operating when the detection results at the terminals OP1, OP2, OP3, and OP4 illustrated in FIG. 16 are obtained. The operation controller 63 determines that the liquid crystal panel 20 is not normally operating when the detection results at the terminals OP1, OP2, OP3, and OP4 illustrated in any of FIGS. 17 to 21 are obtained.

The operation controller 63 causes the display panel 30 to output an image when having determined that the liquid crystal panel 20 is normally operating, and causes the display panel 30 to stop the image outputting when having determined that the liquid crystal panel 20 is not normally operating.

The above description with reference to FIGS. 16 to 21 is made for the case where a square wave as an example of a carrier wave is output from the signal input path line IPA1 and ground potential as an example of a constant potential is output from the signal input path line IPA2. The following describes, with reference to FIGS. 22 to 25, a case where a square wave as an example of a carrier wave is output from the signal input path line IPA2 and ground potential as an example of a constant potential is output from the signal input path line IPA1.

Figure 22:
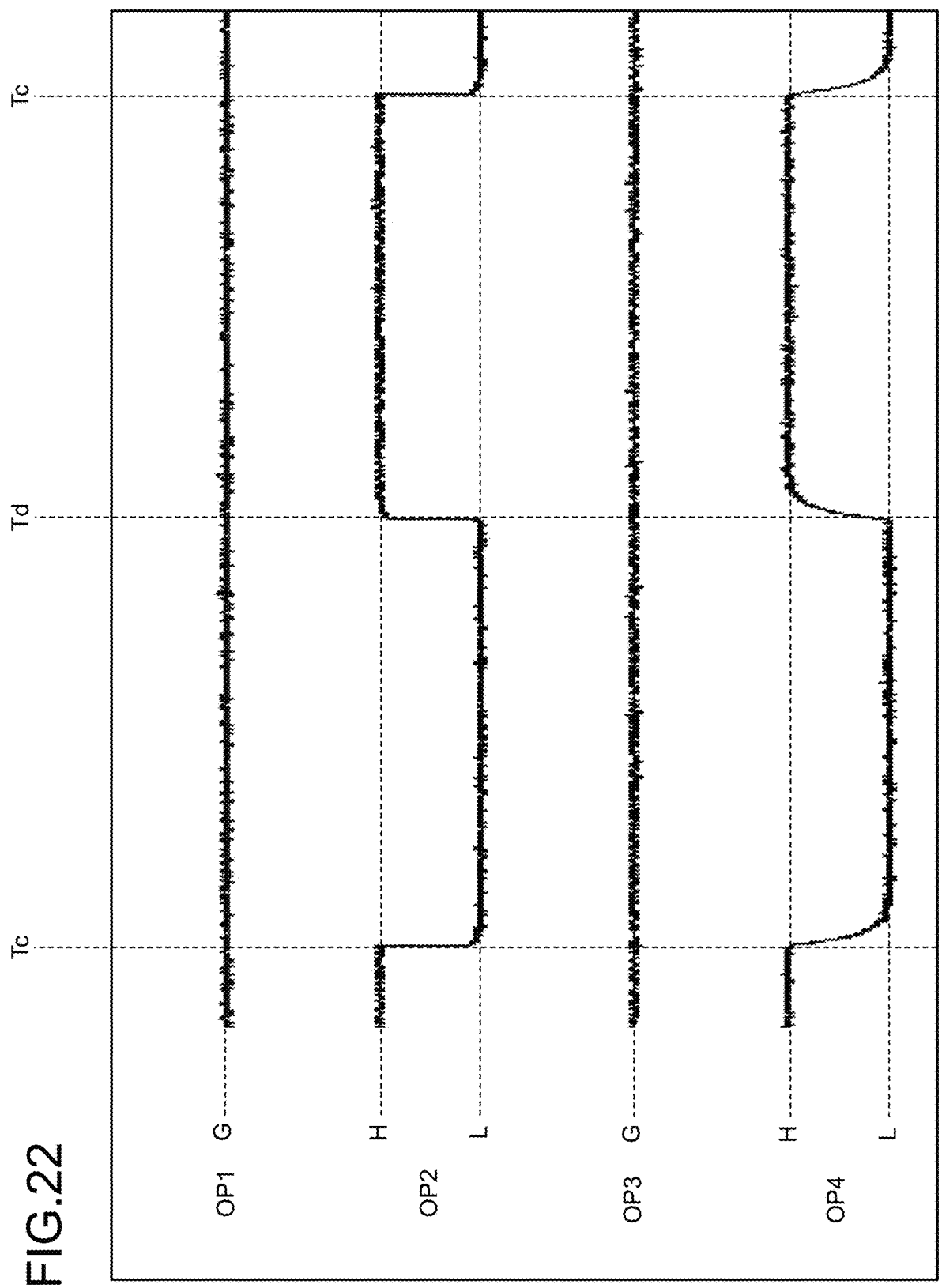
FIG. 22 is a waveform diagram illustrating an example of the input from the terminals OP1, OP2, OP3, and OP4 when the signal transmission paths to the electrodes FE1 and FE2 are normal.

FIG. 22 is a waveform diagram illustrating an example of the input from the terminals OP1, OP2, OP3, and OP4 when the signal transmission paths to the electrodes FE1 and FE2 are normal. The waveform diagrams of FIGS. 22 to 25 are waveform diagrams in a case where a square wave from the signal generator 61 is input to the wiring line IN2 and provided to the electrode FE2 and ground potential from the signal generator 61 is input to the wiring line IN1 and provided to the electrode FE1.

As described above, when a square wave is output from the signal input path line IPA2 of the signal generator 61, the square wave is transmitted to the terminal OP2 through the branch line IPB1. Accordingly, as illustrated in FIG. 22, a square wave appears at the terminal OP2 as a sensing result. In FIG. 22, a square wave that falls from the high level (H) to the low level (L) at timing Tc and rises from the low level (L) to the high level (H) at timing Td is input to the terminal OP2. When ground potential is output from the signal input path line IPA1, the ground potential is transmitted to the terminal OP1 through the branch line IPB1. Accordingly, as illustrated in FIG. 22, the ground potential G is sensed at the terminal OP1.

The ground potential output from the signal input path line IPA1 is also transmitted to the electrode FE1 through the coupling line CN1, the wiring line IN1, and the conductive layer CHC1 and then transmitted from the electrode FE1 to the terminal OP3 through the conductive layer CHC2, the signal output path line OUT1, and the coupling line CN3. Accordingly, as illustrated in FIG. 22, the same constant-potential square wave as that at the terminal OP1 appears at the terminal OP3 as a sensing result.

A square wave output from the signal input path line IPA2 is also transmitted to the electrode FE2 through the coupling line CN2 and the wiring line IN2 and then transmitted from the electrode FE2 to the terminal OP4 through the signal output path line OUT2 and the coupling line CN4. Accordingly, as illustrated in FIG. 22, the same ground potential G as that at the terminal OP2 is sensed at the terminal OP4.

The above description with reference to FIG. 22 is made with the example of the input from the terminals OP1, OP2, OP3, and OP4 when the signal transmission paths to the electrodes FE1 and FE2 are normal, in other words, when the signal transmission paths illustrated in FIG. 15 are normally established. However, when the signal transmission paths becomes different from the signal transmission paths illustrated in FIG. 15 for some reason, the input from the terminals OP1, OP2, OP3, and OP4 becomes different from that illustrated in FIG. 22. The following describes an example of the input from the terminals OP1, OP2, OP3, and OP4, which is different from that illustrated in FIG. 22, with reference to FIGS. 23 to 25.

In description of FIGS. 23 to 25, description of the same detection result as in FIG. 22 will be basically omitted, and detection results different from that in FIG. 22 will be described below. Any matter needed to be specially noted about the same detection result as in FIG. 22 will be supplementarily described.

Figure 23:
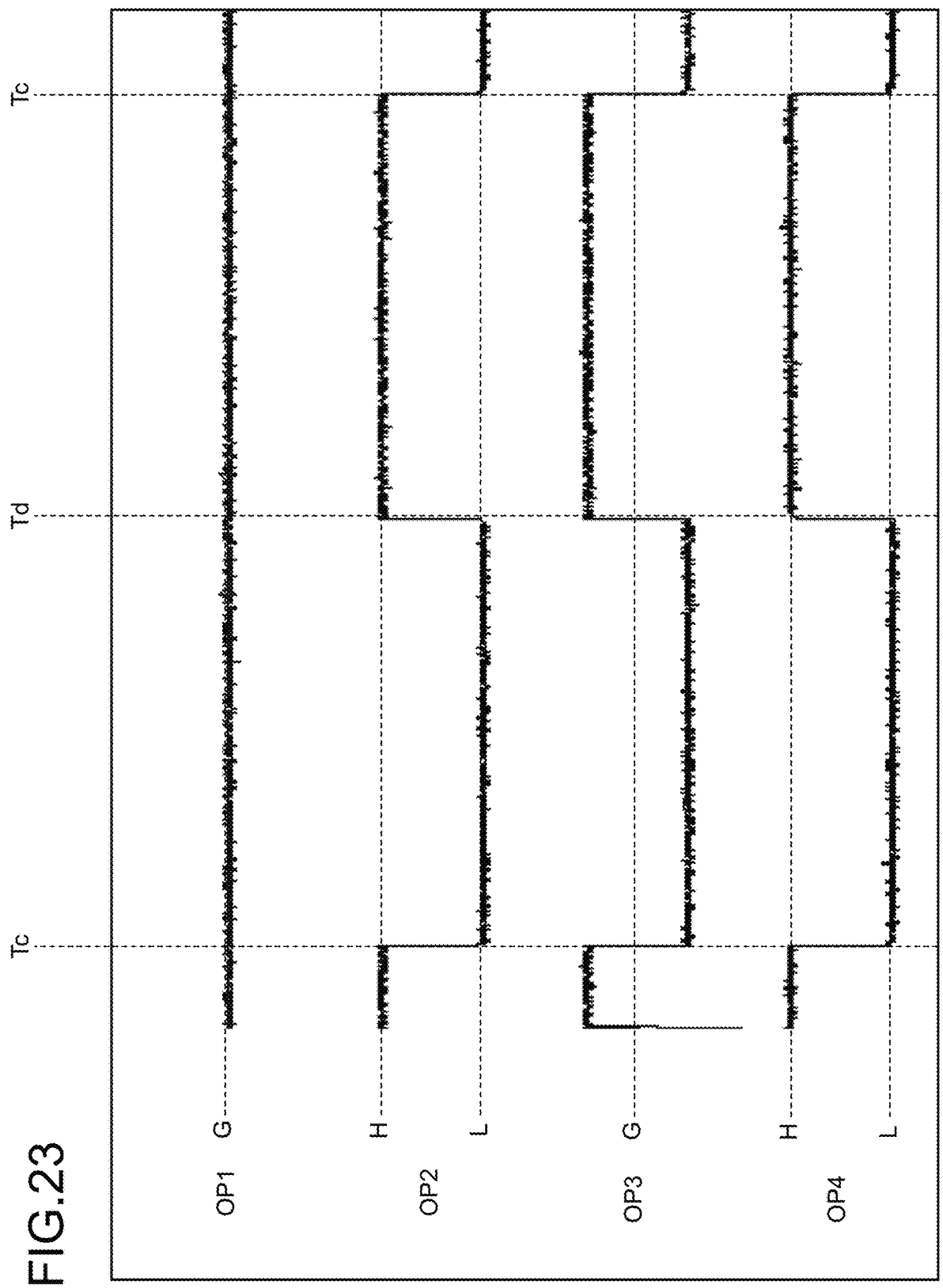
FIG. 23 is a waveform diagram illustrating an example of the input from the terminals OP1, OP2, OP3, and OP4 when coupling between the signal input path line IPA1 and the wiring line IN1 through the coupling line CN1 is disconnected.

FIG. 23 is a waveform diagram illustrating an example of the input from the terminals OP1, OP2, OP3, and OP4 when coupling between the signal input path line IPA1 and the wiring line IN1 through the coupling line CN1 is disconnected. When the coupling between the signal input path line IPA1 and the wiring line IN1 through the coupling line CN1 is disconnected, ground potential output from the signal input path line IPA1 is not transmitted to the electrode FE1. In this case, the potential of the electrode FE1 varies with potential change due to a square wave transmitted to the electrode FE1. Accordingly, in this case, the same square wave as that at the terminal OP4 appears at the terminal OP3 as a sensing result.

Figure 24:
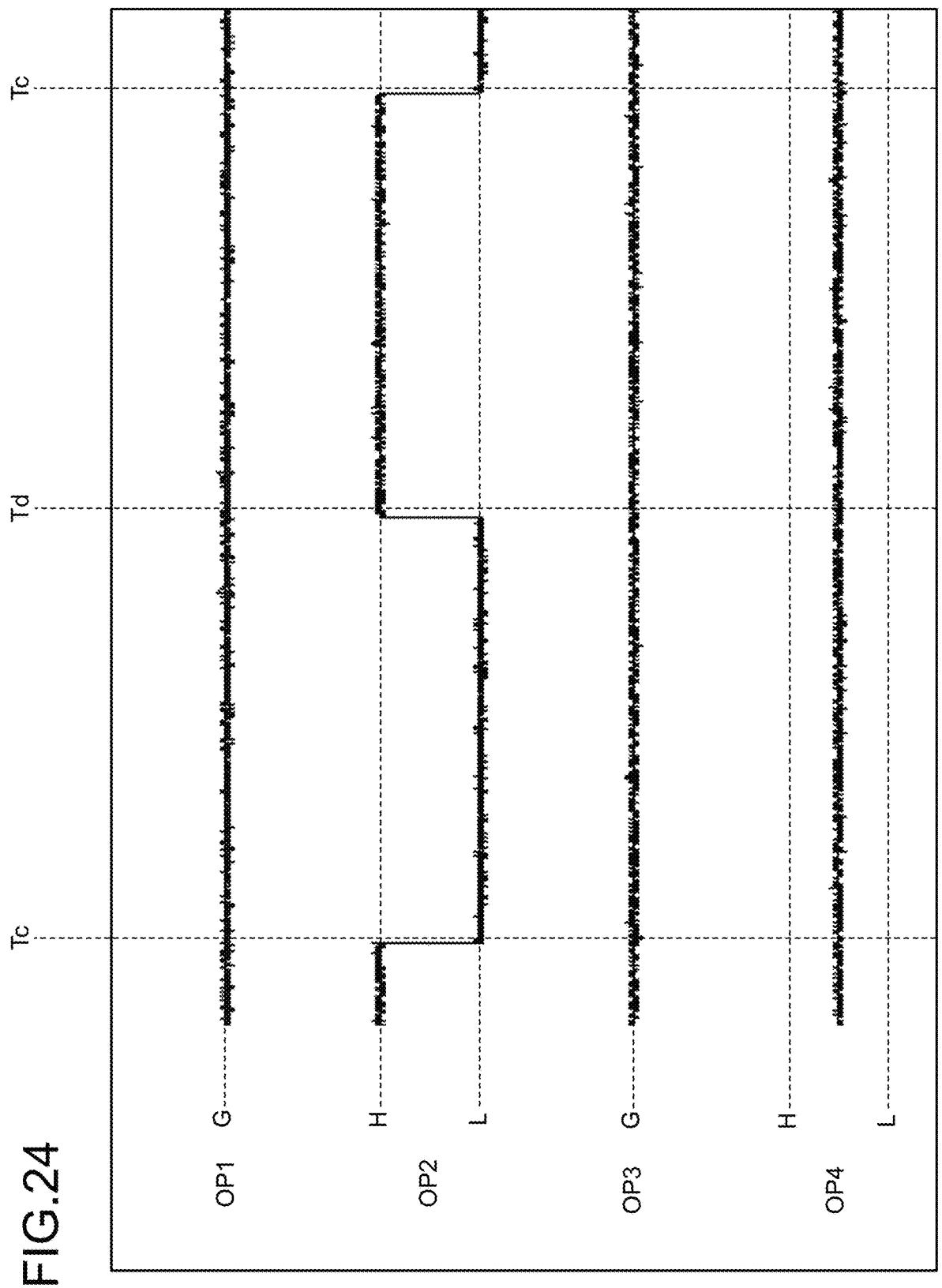
FIG. 24 is a waveform diagram illustrating an example of the input from the terminals OP1, OP2, OP3, and OP4 when coupling between the signal input path line IPA2 and the wiring line IN2 through the coupling line CN2 is disconnected, when coupling between the signal output path line OUT2 and the terminal OP4 through the coupling line CN4 is disconnected, when the wiring line IN1 and the signal output path line OUT2 are short-circuited, or when the signal output path line OUT1 and the signal output path line OUT2 are short-circuited.

FIG. 24 is a waveform diagram illustrating an example of the input from the terminals OP1, OP2, OP3, and OP4 when coupling between the signal input path line IPA2 and the wiring line IN2 through the coupling line CN2 is disconnected, when coupling between the signal output path line OUT2 and the terminal OP4 through the coupling line CN4 is disconnected, when the wiring line IN1 and the signal output path line OUT2 are short-circuited, or when the signal output path lines OUT1 and OUT2 are short-circuited. When the coupling between the signal input path line IPA2 and the wiring line IN2 through the coupling line CN2 is disconnected, a square wave output from the signal input path line IPA2 is not transmitted to the electrode FE2. When the coupling between the signal output path line OUT2 and the terminal OP4 through the coupling line CN4 is disconnected, potential change at the electrode FE2 is not transmitted to the terminal OP4. When the wiring line IN1 and the signal output path line OUT2 are short-circuited, ground potential input from the wiring line IN1 to the electrode FE1 through coupling between the wiring line IN1 and the signal output path line OUT2 is transmitted to the terminal OP4 through the signal output path line OUT2 and the coupling line CN4. In this case, a path (ground path) with the ground potential is established for the electrode FE2 through the signal output path line OUT2. When the signal output path lines OUT1 and OUT2 are short-circuited, the potential states of the electrode FE2 and the terminal OP4 are the same as in a case where the wiring line IN1 and the signal output path line OUT2 are short-circuited. Accordingly, in these cases, a square wave does not appear at the terminal OP4 as a sensing result unlike the case described above with reference to FIG. 22. In this case, as illustrated in FIG. 24, a constant potential is continuously detected at the terminal OP4.

Among the various cases described above with reference to FIG. 24, only in a case where the coupling between the signal output path line OUT2 and the terminal OP4 through the coupling line CN4 is disconnected, only potential change occurring at the electrode FE2 is not transmitted to the terminal OP4, but change in the potential of the electrodes FE1 and FE2 occurs as in the case described above with reference to FIG. 22. However, in the other cases, change in the potential of the electrodes FE1 and FE2 is different from that in the case described above with reference to FIG. 22. Thus, when the same input as in the waveform diagram illustrated in FIG. 24 is obtained from the terminals OP1, OP2, OP3, and OP4, it is desirable to regard that the signal generator 61 is not necessarily normally operating but an anomaly is potentially occurring.

FIG. 25 is a waveform diagram illustrating an example of the input from the terminals OP1, OP2, OP3, and OP4 when the wiring lines IN1 and IN2 are short-circuited. When the wiring lines IN1 and IN2 are short-circuited, the degree of change in the potential of the electrode FE2 due to a square wave transmitted from the signal input path line IPA2 to the wiring line IN2 decreases. Accordingly, as illustrated in FIG. 25, the upper and lower peaks of square waves in the detection results at the terminals OP2 and OP4 do not reach the high level (H) and the low level (L). In other words, when square waves having upper and lower peaks not reaching the high level (H) and the low level (L) appear at the terminals OP2 and OP4 as detection results as illustrated in FIG. 25, it can be assumed that there is a high probability that the wiring lines IN1 and IN2 are short-circuited and problems occur to signal transmission paths related to the signal inputting to the electrodes FE1 and FE2.

When the coupling between the signal output path line OUT1 and the terminal OP3 through the coupling line CN3 is disconnected, the same input from the terminals OP1, OP2, OP3, and OP4 as in FIG. 22 is obtained. However, as for the signal inputting from the signal generator 61 to the liquid crystal panel 20, the signal transmission paths function as in the example described above with reference to FIG. 22 when only the coupling between the signal output path line OUT1 and the terminal OP3 through the coupling line CN3 is disconnected.

In a case where any of the examples of FIGS. 22 to 25 is detected by the signal sensor 62, the operation controller 63 determines that the liquid crystal panel 20 is normally operating when the detection results at the terminals OP1, OP2, OP3, and OP4 illustrated in FIG. 22 are obtained. The operation controller 63 determines that the liquid crystal panel 20 is not normally operating when the detection results at the terminals OP1, OP2, OP3, and OP4 illustrated in any of FIGS. 23 to 25 are obtained.

As described above, according to the embodiment, a display device (the display device 1) includes a display panel (the display panel 30) having a display region configured to output an image, a light source (light source 60) configured to emit light toward one surface side of the display panel, a liquid crystal panel (the liquid crystal panel 20) interposed between the display panel and the light source and provided to be able to change the transmission degree of light between the display panel and the light source, a signal generator (the signal generator 61) coupled to two electrodes (the electrodes FE1 and FE2) facing each other with liquid crystal (the liquid crystal LM) interposed therebetween in the liquid crystal panel and configured to provide an individual electric signal to each of the two electrodes, and a signal sensor (the signal sensor 62) coupled to the two electrodes and configured to individually sense the electric signals provided to the two electrodes. Accordingly, it is possible to sense, with the signal sensor, whether electric signals to be provided are provided to the two electrodes, thereby obtaining information related to the validity of signal transmission paths of the electric signals provided to the two electrodes along with operation of the liquid crystal panel. Thus, according to the embodiment, it is possible to sense the operation state of the liquid crystal panel (liquid crystal panel 20).

The display device (display device 1) further includes an operation controller (the operation controller 63) configured to determine whether the liquid crystal panel (liquid crystal panel 20) is normally operating based on the electric signals sensed through signal input paths (the signal input path lines IPA1 and IPA2) and the electric signals detected through signal output paths (the signal output path lines OUT1 and OUT2), and accordingly, whether the liquid crystal panel is normal or anomalous can be determined.

The signal sensor (signal sensor 62) is coupled to the signal input paths (signal input path lines IPA1 and IPA2) and the signal output paths (signal output path lines OUT1 and OUT2). The signal input paths (signal input path lines IPA1 and IPA2) couple the signal generator (signal generator 61) and the two electrodes (electrodes FE1 and FE2). The signal output paths (signal output path lines OUT1 and OUT2) are coupled to the two electrodes but are not coupled to the signal generator 61. The operation controller (operation controller 63) causes the display panel (display panel 30) to output an image when having determined the liquid crystal panel (liquid crystal panel 20) is normally operating, and causes the display panel to stop the image outputting when having determined that the liquid crystal panel is not normally operating. With this configuration, it is possible to output an image only when the liquid crystal panel is normal and not to output an image when the liquid crystal panel is anomalous.

Thus, it is possible to stop image outputting when it is determined that the liquid crystal panel (liquid crystal panel 20) is not normally operating, for example, during operation in which image outputting that allows an image to be viewed by a user (for example, the user U1) but not by another user (for example, the user U2) is intended in a case where the display device (display device 1) is provided in a four-wheel automobile. Accordingly, it is possible to reduce occurrence of a state in which the other user can unintentionally view the image. Thus, in a case where, for example, the other user is a driver of the four-wheel automobile, it is possible to reduce occurrence of an unintended situation such as distraction due to unintentional viewing of the image during driving.

One (for example, the first liquid crystal panel 20A) of two of the liquid crystal panels 20 is provided as an E-mode liquid crystal panel, and the other (for example, the second liquid crystal panel 20B) is provided as an O-mode liquid crystal panel. With this configuration, it is possible to achieve image display output utilizing both the advantage of the E-mode liquid crystal panel and the advantage of the O-mode liquid crystal panel. The advantage of the E-mode liquid crystal panel is steep decline in the transmittance of light for the line of light at a specific angle (for example, at or near the view angle of $-30°$). The advantage of the O-mode liquid crystal panel is stable decline in the transmittance of light in a broader range (for example, on the negative ($-$) side of the view angle of $-30°$). Any of the E-mode and O-mode liquid crystal panels can transmit light with which the image can be sufficiently viewed in a view angle range except for a view angle range in which the transmittance of light decreases significantly. In this manner, according to the embodiment, it is possible to simultaneously establish the view angle range in which the image can be viewed and the view angle range in which the image cannot be viewed, and more reliably ensure a wider view angle range in which the image cannot be viewed.

The liquid crystal panel 20 in operation causes the transmission degree of light tilted toward one side in the longitudinal direction of the display panel (display panel 30) having a rectangular shape (one side in the first direction X) with respect to a facing direction (the third direction Z) and the transmission degree of light tilted toward the other side in the longitudinal direction (the other side in the first direction X) to be different from each other, and the facing direction is a direction in which the display panel and the light source (light source 60) face each other. Accordingly, it is possible to simultaneously establish the view angle range in which the image can be viewed and the view angle range in which the image cannot be viewed.

The positional relation between the E-mode liquid crystal panel and the O-mode liquid crystal panel between the display panel (display panel 30) and the light source (light source 60) may be the inverse of that in the embodiment. In this case, the relation between the transmission axis direction and the absorption axis direction of each of the first polarization layer 11, the second polarization layer 12, and the third polarization layer 13 may be inverted. The slow axis directions V02 and V08 of the retardation generation layers 51 and 52 may be changed so that the slow axis directions are line symmetric with respect to the second direction Y.

In the embodiment, the light adjuster 10 includes the two liquid crystal panels 20, but the number of liquid crystal panels 20 is not limited to two but may be one or may be equal to or larger than three. In a case where a configuration in which the number of liquid crystal panels 20 is different from that in the embodiment is employed, it is possible to form the transmission path LV of light as in the embodiment by adding or changing optical members such as a polarization layer and a retardation generation layer as appropriate in accordance with the angle of polarization.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
a display panel having a display region configured to output an image;
a light source configured to emit light toward one surface side of the display panel;
a liquid crystal panel interposed between the display panel and the light source and provided to be able to change a transmission degree of light between the display panel and the light source;
a signal generator coupled to two electrodes facing each other with liquid crystal interposed between the electrodes in the liquid crystal panel and configured to provide an individual electric signal to each of the two electrodes;
a signal sensor coupled to the two electrodes and configured to individually sense the electric signals provided to the two electrodes; and
an operation controller configured to control operation of the display panel based on a sensing result of the electric signals by the signal sensor,
wherein
the signal sensor is coupled to signal input paths and signal output paths,
the signal input paths are configured to couple the signal generator and the two electrodes, and the signal output paths are coupled to the two electrodes but are not coupled to the signal generator, and
the operation controller is configured to
determine whether the liquid crystal panel is normally operating based on the electric signals sensed through the signal input paths and the electric signals detected through the signal output paths,
cause the display panel to output an image when having determined that the liquid crystal panel is normally operating, and
cause the display panel to stop the image outputting when having determined that the liquid crystal panel is not normally operating.

2. The display device according to claim 1, wherein two of the liquid crystal panels are provided, and
one of the two liquid crystal panels is provided as an E-mode liquid crystal panel, and the other is provided as an O-mode liquid crystal panel.

3. The display device according to claim 1, wherein the liquid crystal panel in operation makes a transmission degree of light tilted toward one side in a longitudinal direction of the display panel having a rectangular shape with respect to a direction in which the display panel and the light source face each other and a transmission degree of light tilted toward the other side in the longitudinal direction to be different from each other.

* * * * *